US012649249B2

(12) United States Patent (10) Patent No.: US 12,649,249 B2
Defrance et al. (45) Date of Patent: Jun. 9, 2026

(54) HIGH-RATE CLEANABLE ROBOT CELL

(71) Applicant: VELEC SYSTEMS, Wattrelos (FR)

(72) Inventors: Marie-Noëlle Defrance, Cambrin (FR);
Florian Ghestem, Linselles (FR)

(73) Assignee: VELEC SYSTEMS, Wattrelos (FR)

( * ) Notice: Subject to any disclaimer, the term of this
patent is extended or adjusted under 35
U.S.C. 154(b) by 748 days.

(21) Appl. No.: 18/160,815

(22) Filed: Jan. 27, 2023

(65) Prior Publication Data

US 2023/0234217 A1 Jul. 27, 2023

(30) Foreign Application Priority Data

Jan. 27, 2022 (FR) ...................................... 2200715

(51) Int. Cl.
 B25J 1/00 (2006.01)
 B25J 1/08 (2006.01)
 B25J 9/00 (2006.01)
 B25J 11/00 (2006.01)
 B25J 17/02 (2006.01)
 (Continued)

(52) U.S. Cl.
 CPC ................. B25J 21/00 (2013.01); B25J 1/08
 (2013.01); B25J 9/0009 (2013.01); **B25J
 9/0018 (2013.01); B25J 9/003** (2013.01);
 B25J 9/0084 (2013.01); B25J 11/0045
 (2013.01); B25J 17/0266 (2013.01); **B25J
 19/0058 (2013.01); B65G 47/90** (2013.01)

(58) Field of Classification Search
 CPC ... B25J 21/00; B25J 1/08; B25J 9/0009; B25J
 9/0018; B25J 9/003; B25J 9/0084; B25J
 11/0045; B25J 17/0266; B25J 19/0058;
 B65G 47/90
 See application file for complete search history.

(56) References Cited

U.S. PATENT DOCUMENTS

2009/0261230 A1* 10/2009 Imhof ................... B25J 9/0009
                                                         248/672
2016/0288339 A1* 10/2016 Akaha ...................... B25J 9/046
                         (Continued)

FOREIGN PATENT DOCUMENTS

DE      102012018940 A1   3/2014
DE      102015225332 A1   6/2017
                 (Continued)

OTHER PUBLICATIONS

International Search Report issued on Sep. 13, 2022, in correspond-
ing French Application No. 2200715, 10 pages.

*Primary Examiner* — Thomas Randazzo
(74) *Attorney, Agent, or Firm* — Maier & Maier, PLLC

(57) ABSTRACT

A robot cell including a structure delimiting a cell with a
closed section, typically polygonal, in particular rectangular,
with metallic corner posts, extending vertically to the edges
of the cell, the corner posts being preferably equipped at the
lower ends of the posts with underframes intended to bear on
the ground, metallic upper crossbars linking, in pairs, the
upper ends of the posts over a periphery of the section cell,
a central support formed by the assembly of metallic ele-
ments, extending over the cell between the upper crossbars
resting locally at fastening supports on the upper crossbars,
at intermediate areas of the upper crossbars, and a parallel-
kinematics robot, housed within the volume of the cell.

19 Claims, 14 Drawing Sheets

(51) Int. Cl.
    *B25J 19/00*        (2006.01)
    *B25J 21/00*        (2006.01)
    *B65G 47/90*       (2006.01)

(56)                References Cited

U.S. PATENT DOCUMENTS

| | | | | |
|---|---|---|---|---|
| 2016/0325400 | A1* | 11/2016 | Murakami | ............. B25J 9/0018 |
| 2017/0282634 | A1* | 10/2017 | Jones | ....................... B65H 5/08 |
| 2020/0391373 | A1* | 12/2020 | Cammarata | ............ B25J 9/0018 |
| 2022/0347839 | A1* | 11/2022 | Schubert | ......... G05B 19/41845 |

FOREIGN PATENT DOCUMENTS

| | | | |
|---|---|---|---|
| EP | 2110211 | B1 | 9/2011 |
| EP | 3153025 | | 4/2018 |

* cited by examiner

HIGH-RATE CLEANABLE ROBOT CELL

FIELD

The present disclosure relates to a robot cell comprising a structure comprising a cell with a closed section, typically polygonal, in particular rectangular, as well as a robot typically a parallel-kinematics robot, housed within the volume of the cell.

The structure of the cell comprises metallic corner posts extending vertically to the edges of the cell, the corner posts being equipped, preferably at the lower ends of the posts, with underframes bearing on the ground, and with metallic upper crossbars linking, in pairs, the upper ends of the posts over a periphery of the cell with a closed section. The cell may also comprise lower crossbars, linking posts of the cell, and possibly intermediate crossbars, linking posts of the cell, intermediate crossbars located between an upper crossbar and a lower crossbar.

The robot cell also includes a central support formed by the assembly of metallic elements, extending over the cell between the upper crossbars. The central support rests locally at fastening positions on the upper crossbars, at the intermediate areas of the upper crossbars.

Preferably, the robot is a parallel-kinematics robot comprising a base unit fastened to and hanging from the central support, as well as a platform movable relative to the base unit according to a plurality of main axes. At least two movable actuation arms link the base unit to the platform and are configured to move the platform relative to the base unit. A gripper is coupled to the platform preferably rotatably about an auxiliary axis.

The cell comprises at least one conveyor for products, which crosses the cell, positioned below an area of action of said robot. In such a cell, the robot is configured to perform transfers of products comprising depositions over the surface of the conveyor, or for pick-ups on the surface of the conveyor.

More particularly, the present disclosure relates to the field of robot cells finding a particular application in the food industry. For example, such a cell may find a particular application in picking up food products, and loading them in compartments of a packaging, for example a thermoformed packaging.

It should be understood that it is interesting for the industrial that the loading operations have a high rate, in order to increase production capabilities. It is desired as much as possible to make the parallel-kinematics robot work at the highest possible rate. A parallel-kinematics robot, as disclosed for example in the document WO 2019/206403A1 allows working at high rate, typically higher than 100 transfers per minute.

In the food industry or another industry having to comply with hygiene conditions, it is common to proceed with wet cleaning of the production lines on a regular basis, including the robot cells, typically by high-pressure water jet.

BACKGROUND

In order to be able to meet the high production rates of the parallel-kinematics robot while guaranteeing an accuracy of the gripper of the robot during its work on the pick-up or deposition surface, such as the surface of the conveyor, it is common to stiffen the structure of the cell as much as possible.

Having a cell structure having a significant stiffness allows holding the position of the base unit of the robot which hangs at the upper portion of the structure at a fixed position with respect to the object pick-up/deposition surface while limiting the deformations of the structure, even when the robot works at high speed and imparts inertial forces on the structure because of the high accelerations of the movable portions of the robot.

To this end, it is common for a person skilled in the art to use beams in the form of frame profiles with a closed section for the corner posts, and possibly for the intermediate posts of the structure, and upper crossbars, as well as for the beams of the central support, as these frame profiles with a closed section ensure maximum stiffness of the structure guaranteeing compliance with the accuracy of the robot, even at high rate.

FIGS. 1 to 3 illustrate as example an embodiment of a robot cell based on the use of beams with a closed section, for example a square frame profile for the corner posts, and with a round section for the crossbars, in particular the upper, lower, and intermediate crossbars, as well as for the central support fastened at intermediate positions on the upper crossbars. A robot cell structure based on mechanical welding of frame profiles with a closed section guarantees a stiffness allowing making the robot work at high speed, while guaranteeing the work accuracy of the robot necessary to the transfers.

According to the observations of the Applicant, such a structure including tubular beams with a closed section might pose difficulties when wet cleaned at high pressure, since it is not guaranteed that water would not get into the cavity of the beam with a closed section. In the event of infiltration, water is trapped within the beam, inaccessible for cleaning operations and then forms an environment conducive to the growth of pathogens. The hollow beams then become a source of pathogens incompatible with compliance with sanitary requirements.

Prior art US2009261230 A1 teaches a support frame for robots, in particular for use in applications for which hygiene is critical, for example in the handling of foods, pharmaceuticals, or medical equipment products, and/or packaging for same. The support frame is formed from an essentially open frame profile which is closed, at the most, only in places. The support frame includes two side structures joined together via two transverse brace on which is supported a robot.

SUMMARY

The present disclosure improves the situation by providing a robot cell guaranteeing high cleanability of the structure while preserving high production capabilities.

A robot cell is provided comprising:
- a structure delimiting a cell with a closed section, typically polygonal, in particular rectangular, comprising:
  - metallic corner posts, extending vertically to the edges of the cell, the corner posts being preferably equipped at the lower ends of the posts with underframes bearing on the ground,
  - metallic upper crossbars linking, in pairs, the upper ends of the posts over a periphery of the section cell,
  - a central support formed by the assembly of metallic elements, extending over the cell between the upper crossbars, resting locally at fastening supports on the upper crossbars, at intermediate areas of the upper crossbars,
- a parallel-kinematics robot, housed within the volume of the cell, said robot comprising:
  - a base unit fastened to and hanging from the support,

a platform movable relative to the base unit according to a plurality of main axes, at least two movable actuation arms inking the base unit to the platform configured to move the platform relative to the base unit, a gripper coupled to the platform, preferably rotatably about an auxiliary axis, and wherein at least one conveyor for products, crosses the cell, positioned below an action area of said robot, and wherein the robot is configured to perform transfers of products comprising depositions over the surface of the conveyor, or for pick-ups on the conveyor surface.

According to the present disclosure, the metallic structure comprises an assembly of metallic beams with an open section, the open section including a concave portion and a convex portion, the beams with an open section being configured to ensure wet cleanability of the structure guaranteeing the evacuation of water from the concave portions of the beams, the concave portions remaining accessible for cleaning operations, at least with regards to the corner posts, the upper crossbars and preferably the support and in that all of the upper crossbars are arcuate, so that the intermediate area of the upper crossbar at which the central support is locally fastened, is at a higher height with respect to the distal ends of the crossbar in connection with two of the successive corner posts of the cell.

The features set out in the next paragraphs may optionally be implemented. They may be implemented independently or in combination:

the structure preferably has no tubular beam with a closed section in particular likely to trap moisture;

all of the upper crossbars are preferably arcuate, the intermediate areas of the upper crossbars on which or proximate to which the central support rests located at higher heights with respect to the distal ends of the upper crossbars in connection with the corner posts of the cell;

the beam(s) of all or part of the upper crossbars comprise(s) two longitudinal fold lines, in continuation, with a first longitudinal fold line over a first lengthwise section of the beam, and a second longitudinal fold line over a second lengthwise section, the first lengthwise section extending along the first fold line, and the second lengthwise section extending along the second fold line, the first fold line and the second fold line being inclined with respect to one another to form an arch whose apex is at the junction between the first lengthwise section and the second lengthwise section of the upper crossbar;

the beam forming an upper crossbar has, on the one hand, on the lower side with respect to the two fold lines in continuation, a main wall integrally in one-piece, and on the other hand, on the upper side with respect to the two fold lines in continuation, two auxiliary walls inclined with respect to the main wall, with a first auxiliary wall adjacent by the first longitudinal fold line to the main wall, forming a L-shaped section over the first lengthwise section, and a second auxiliary wall adjacent by the second longitudinal fold line to the main wall, forming a L-shaped section over the second lengthwise section, the two auxiliary walls being inclined with respect to one another, separate by a cutout at the apex of the arch:

the lower border of the main wall comprises at the junction area between the first lengthwise section and the second lengthwise section of the upper crossbar, a horizontal flat portion against which bears an upper end of a beam with an open section of an intermediate post configured to support the apex of the arch, the lower border being preferably inclined parallel to the direction of the first longitudinal fold over the first lengthwise section, and parallel to the second longitudinal fold over the second lengthwise section;

the cell has a rectangular section, for example square comprising corner posts, four in number, and upper crossbars, four in number, the upper crossbars respectively linking the upper ends of two consecutive ones of the corner posts.

According to one embodiment, the structure of the central support extends over a horizontal plane, the structure comprising:

a first transverse beam extending along a first direction, with an open section linking two among the four upper crossbars, the two upper crossbars, the first upper crossbar and the second upper crossbar, parallel to one another and opposite to one another, the distal ends of the beam with an open section of the first transverse beam secured to the two upper crossbars at the apexes of the arches formed by the first and second upper crossbars, a second transverse beam, with an open section, extending along a second direction, perpendicular to the first direction, linking a third one amongst the upper crossbars, from the apex of the arch formed by the third crossbar up to the middle of the first transverse beam, a third transverse beam, with an open section, extending according to a third direction, and a fourth transverse beam, with an open section extending according to a fourth direction, preferably symmetrically to the third transverse beam with respect to the second direction, the third transverse beam, and the fourth transverse beam both extending from the apex of the arch of a fourth upper crossbar, respectively up to two fastening positions on the first beam, the two fastening positions being offset on either side of the middle of the first transverse beam, and wherein the first transverse beam, the third transverse beam and the fourth transverse beam form the three sides of a support triangle, in particular isosceles, and possibly equilateral, and wherein the base unit is fastened by three anchor points respectively distributed at the middles of the three sides of the triangle.

According to one embodiment, the second transverse beam is obtained by folding a sheet metal forming a structure element integrally in one-piece, the structure element forming not only the second transverse beam extending along the second direction, but also an intermediate post, extending vertically downwards, the intermediate post supporting the apex of the arch of the third upper crossbar.

According to one embodiment, the third transverse beam and the fourth transverse beam are obtained by folding a sheet metal forming a structure element integrally in one-piece forming not only the third transverse beam and the fourth transverse beam, but also an intermediate post, extending vertically as a downward continuation of the third beam and of the fourth beam, the intermediate post supporting the apex of the arch of the fourth upper crossbar.

According to one embodiment, the robot cell has a rectangular section and wherein two among the four upper crossbars are transversal upper crossbars, oriented transversely to a longitudinal axis of the cell and the other two upper crossbars are longitudinal crossbars, oriented longitudinally to a longitudinal axis of the robot cell and wherein the central support which bears on the intermediate areas at the apexes of the four upper crossbars supports two robots arranged, side-by-side, along a longitudinal direction of the rectangular section, the two robots including a first robot and a second robot.

According to one embodiment, a structure of the central support supporting the two robots extend over a horizontal plane, the structure comprising a first structure portion and a second structure portion, contiguous to each other.

The first structure portion for the support of the first robot may comprise:

a first transverse beam extending along a first direction, with an open section linking the two longitudinal crossbars, the longitudinal first upper crossbar, and the longitudinal second upper crossbar, parallel to one another and opposite to one another, the distal ends of the beam with an open section of the first transverse beam secured to the two upper crossbars at the apexes of the arches formed by the first and second upper crossbars, a second transverse beam, with an open section, extending according to a second direction, and a third transverse beam, with an open section extending according to a third direction, preferably symmetrically to the third transverse beam with respect to a longitudinal axis of the cell, the second transverse beam, and the third transverse beam both extending from the apex of the arch of a transverse third upper crossbar, respectively up to two fastening positions on the first transverse beam, the two fastening positions being offset on either side of the middle of the first transverse beam, the first transverse beam, the second transverse beam and the third transverse beam forming the three sides of a first support triangle, in particular isosceles, and possibly equilateral, and wherein a base unit of the first robot is fastened by three anchor points respectively distributed at the middles of the three sides of the triangle.

The second structure portion for the support of the second robot may comprise:

a fourth transverse beam extending along a direction parallel to the first direction, with an open section linking the two longitudinal crossbars forming the first crossbar and the second crossbar, the distal ends of the beam with an open section of the first transverse beam secured to the two upper crossbars at the apexes of the arches formed by the first and second upper crossbars, a fifth transverse beam, with an open section, extending according to a fourth direction, and a sixth transverse beam, with an open section extending according to a fifth direction, preferably symmetrically to the fifth transverse beam with respect to a longitudinal axis of the cell, the fifth transverse beam, and the sixth transverse beam both extending from the apex of the arch of a transverse fourth upper crossbar, respectively up to two fastening positions on the fourth transverse beam, the two fastening positions being offset on either side of the middle of the fourth transverse beam, the fourth transverse beam, the fifth transverse beam and the sixth transverse beam forming the three sides of a second support triangle, in particular isosceles, and possibly equilateral, and wherein a base unit of said second robot is fastened by three anchor points respectively distributed at the middles of the three sides of the second triangle.

According to one embodiment, the structure comprises struts with an open section, each respectively joining, from a distal end of the strut, a corner post, at an intermediate position on the post, to one of the upper crossbars, at an intermediate position of the upper crossbar.

According to one embodiment, the robot cell comprises partition walls delimiting the inner volume of the cell, the partition walls extending respectively between the corner posts of the metallic structure, the partition walls configured to partition the inner volume of the cell and prevent access thereto from the outside, the robot cell has on at least one side an access opening closed by a door and wherein the metallic structure comprises one or more lower crossbar(s) and/or several ones of the intermediate crossbars with open sections, extending horizontally between two successive ones among the corner posts of the structure, linking by its ends the two corners posts, or one amongst the corner posts to an intermediate post.

According to one embodiment, all or part of the lower crossbars, and/or all or part of the intermediate crossbars are obtained by folding a sheet metal, comprising one or more longitudinal fold line(s), and wherein the upper flange of the lower crossbar or of the intermediate crossbar is inclined forming a deflector with a slope descending outwardly of the robot cell, the deflector(s) positioned in line with the partition walls, so that cleaning water flowing by gravity upon descending an inner face of a partition wall is diverted by the deflector to the outside of the robot cell.

According to one embodiment, the beams with an open section of the corner posts are formed by folded sheet metals with a L-shaped section; each having a longitudinal fold line, preferably the concavity oriented outwardly of the cell.

According to one embodiment, the sheet metal with a L-shaped section, has proximate to its lower end two local extensions extending respectively beyond the longitudinal borders of the L via a second fold and a third fold of the sheet metal, the extensions converging towards one another so that the lower edge of the beam comprises the L-shaped section of the frame profile, as well as two additional supports of the two local extensions bearing on the underframe.

According to one embodiment, the robot cell may comprise an electrical box accommodating an electric power supply unit, and possibly a control unit of the robot, and wherein the electrical box is a structural metallic box integral with the structure of the robot cell, said electrical box being welded to the beams with open sections of the frame, in particular welded to two posts of the structure, for example to one of the corner posts and one of the intermediate posts, and/or welded to two of the corner posts of the cell and/or in particular welded to two crossbars of the structure.

According to one embodiment, the robot cell may comprise a cleaning box accommodating a fluid cleaning unit. Such a cleaning unit comprises an inlet for a cleaning fluid external source, as well as several outlets connected to one or more hose(s).

The box accommodates control valves, and a unit for controlling the control valves configured to implement an automated cleaning cycle.

Advantageously, the cleaning box may be a structural metallic box integral with the structure of the robot cell. The cleaning box is welded to the beams with open sections of the structure, in particular welded to two posts of the frame, for example to a corner post and an intermediate post, or welded to two consecutive corner posts of the cell and/or in particular welded to two crossbars of the structure.

The present disclosure also relates to a method for transferring products comprising providing a robot cell according to the present disclosure, and controlling the parallel-kinematics robot to proceed with transfers, namely deposit products over the surface of the conveyor from a pick-up area, or pick up products on the surface of the conveyor and deposit them over a deposition area and according to a rate typically up to 100 transfers per minute and for an amplitude typically up to 1,300 millimeters, while limiting the vertical oscillations of the gripper due to the deformation of the structure, lower than or equal to a threshold value, lower than 2 millimeters.

As example, and according to a non-limiting example, the rate may, depending on the conditions, be higher than 70, and possibly 80 transfers per minute for example comprised between 80 and 100, and for an amplitude of the transfer preferably higher than or equal to 400 millimeters along the transverse direction, and higher than or equal to 50 mm along the height, while limiting the vertical oscillations of the gripper due to the deformation of the structure, lower than or equal to a threshold value, lower than 2 mm.

The method finds a particular application to carry out transfers of food products in particular to proceed with packaging thereof.

BRIEF DESCRIPTION OF THE DRAWINGS

Other features, details and advantages will appear upon reading the detailed description hereinafter, and upon analyzing the appended drawings, wherein.

an intermediate crossbar, with an open section, in the form of a folded sheet metal, having an upper flange, the upper flange being positioned in line with the upper partition wall and inclined so that its slope is advantageously configured to divert the cleaning water flowing from the inner face of the upper partition wall and divert it outwardly of the cell, a lower crossbar, with an open cell, in the form of a folded sheet metal having an upper flange, in the form of a folded sheet metal, having an upper flange, the upper flange being positioned in line with the lower partition wall and inclined so that its slope is advantageously configured to divert the cleaning water flowing from the inner face of the lower partition wall and divert it outwardly of the cell.

Figure 8:
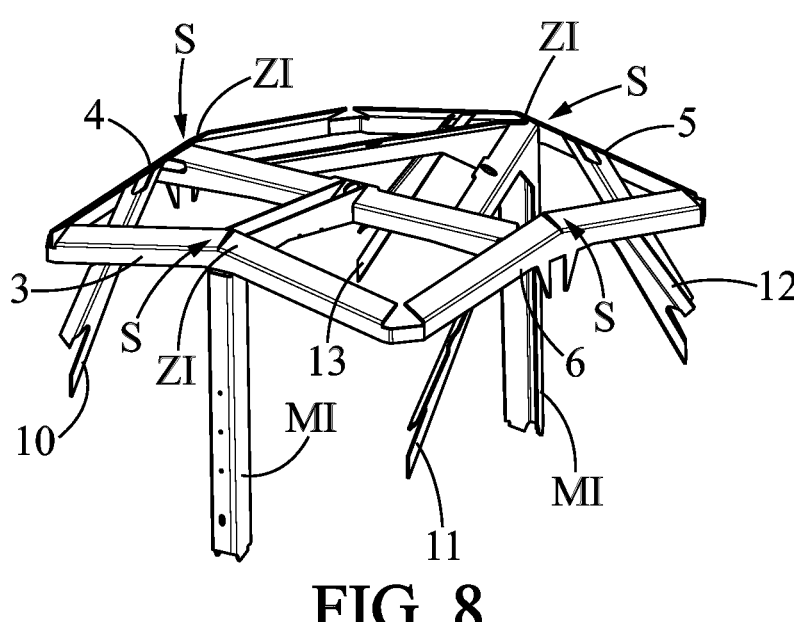

FIG. 8 is a view of the upper portion of the structure bearing on the corner posts, including at the periphery thereof four upper crossbars, each arcuate, and inside thereof the central support is fastened at four respective local intermediate areas, on the upper crossbars, at the apexes of the arches formed by the crossbars, the structure being formed by beams with an open section.

Figure 9:
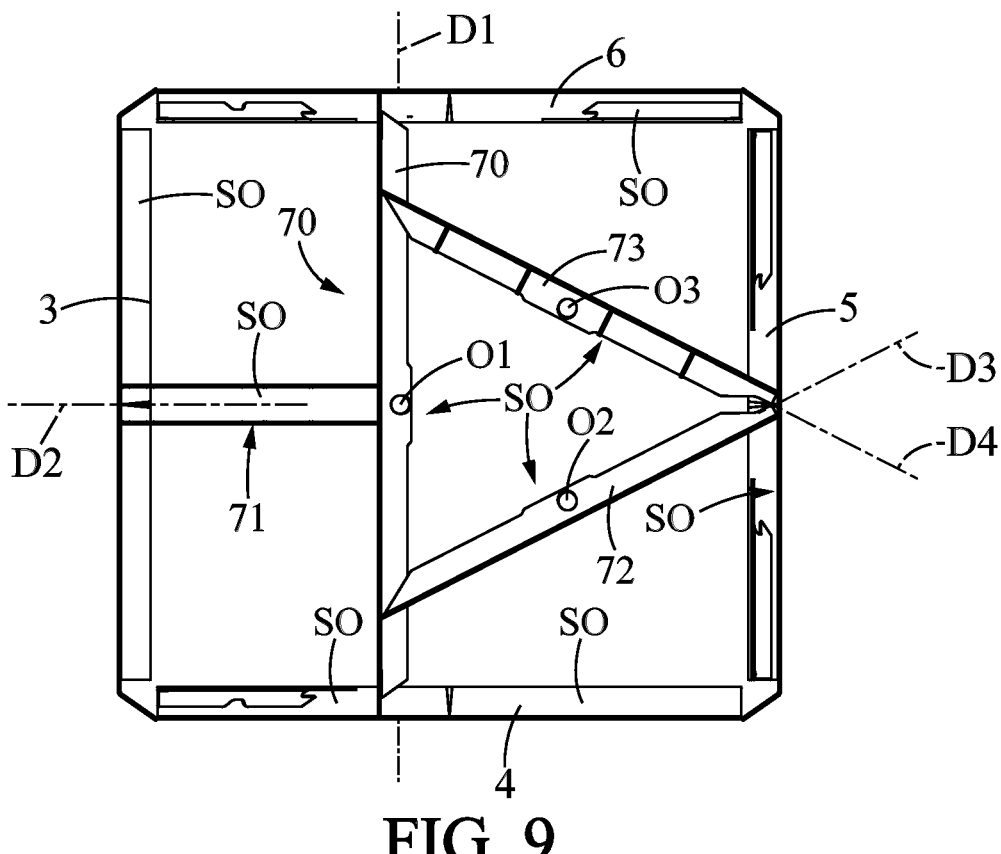

FIG. 9 is a bottom view of the upper portion of the structure, illustrated in FIG. 8 illustrating a structure of the central support which extend over a horizontal plane, the structure comprising:

a first transverse beam extending along a first direction with an open section linking two among the four upper crossbars, the two upper crossbars, the first upper crossbar and the second upper crossbar parallel to one another and opposite to one another, a second transverse beam, with an open section, extending along a second direction, perpendicular to the first direction, linking a third one amongst the upper crossbars, from the apex of the arch formed by the third crossbar up to the middle of the first transverse beam, a third transverse beam, with an open section, extending according to a third direction, and a fourth transverse beam, with an open section extending according to a fourth direction, preferably symmetrically to the third transverse beam with respect to the second direction, both of the third transverse beam and the fourth transverse beam extending from the apex of the arch of a fourth upper crossbar, respectively up to two fastening positions offset on either side of the middle of the first transverse beam, and wherein the first beam, the third beam and the fourth beam form the three sides of a support triangle, in particular isosceles, and possibly equilateral, on which the robot is hung.

Figure 10:
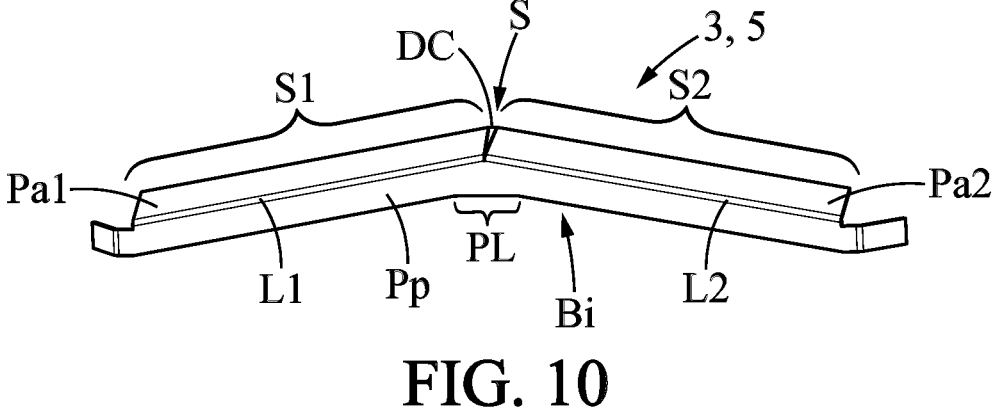

FIG. 10 is a view of a beam forming the third or fourth upper crossbar.

Figure 11:
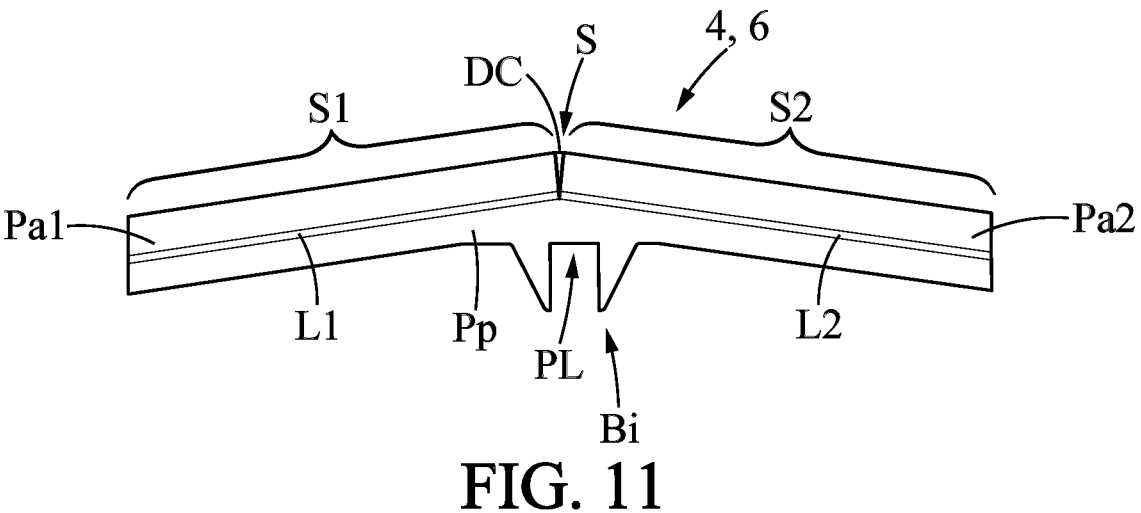

FIG. 11 is a view of a beam forming an upper crossbar, the third or fourth upper crossbar.

Figure 12:
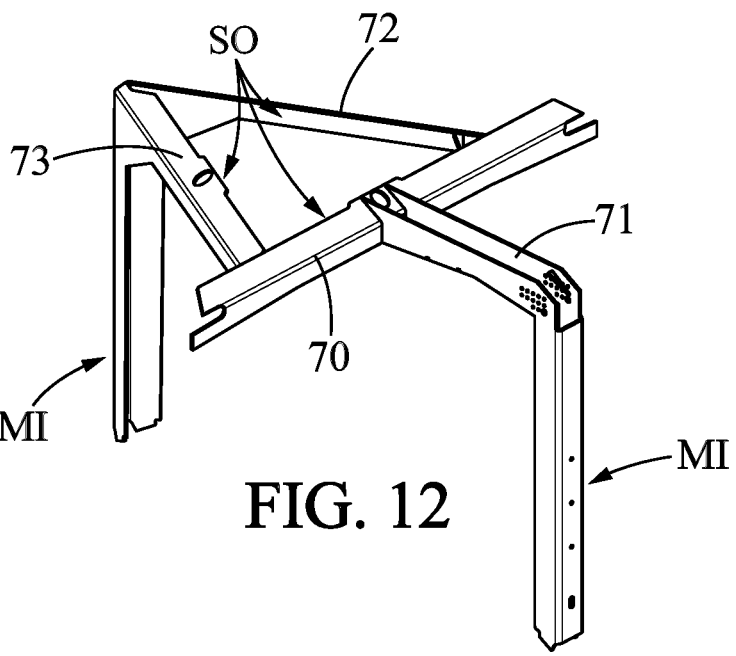

FIG. 12 is a detail view of three elements integrally in one-piece forming the central support, as well as two intermediate posts supporting the apexes of the third and fourth upper crossbars.

Figure 13:
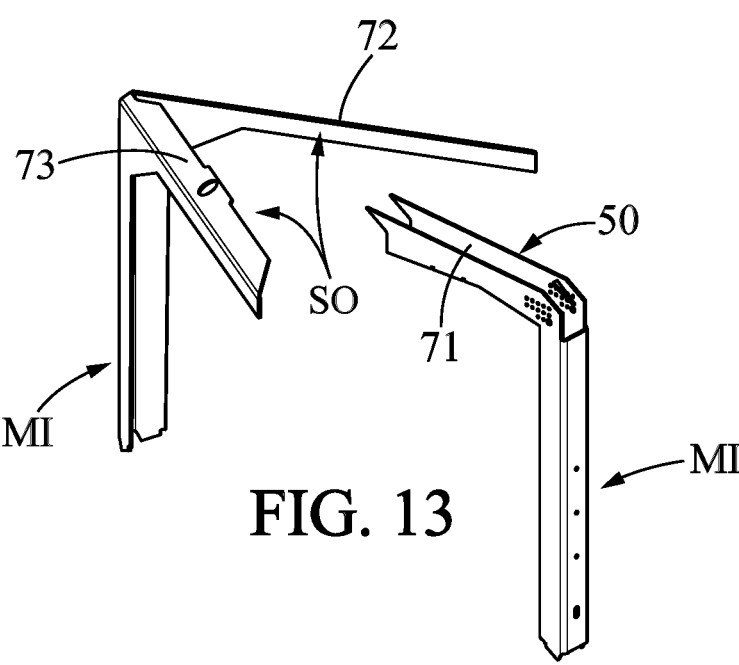

FIG. 13 is a detail view of two among the three elements integrally in one-piece illustrated in FIG. 12 illustrating in particular:

the second transverse beam which is obtained by folding a sheet metal forming a structure element integrally in one-piece forming not only the second transverse beam extending along the second direction, but also an inter-mediate post, extending vertically downwards, the intermediate post supporting the apex of the arch of the third upper crossbar, the third transverse beam and the four transverse beam which are obtained by folding a sheet metal forming a structure element integrally in one-piece forming not only the third transverse beam and the fourth transverse beam, but also an intermediate post, extending verti-cally as a downward continuation of the third beam and of the fourth beam, the intermediate post supporting the apex of the arch of the fourth upper crossbar.

Figure 14:
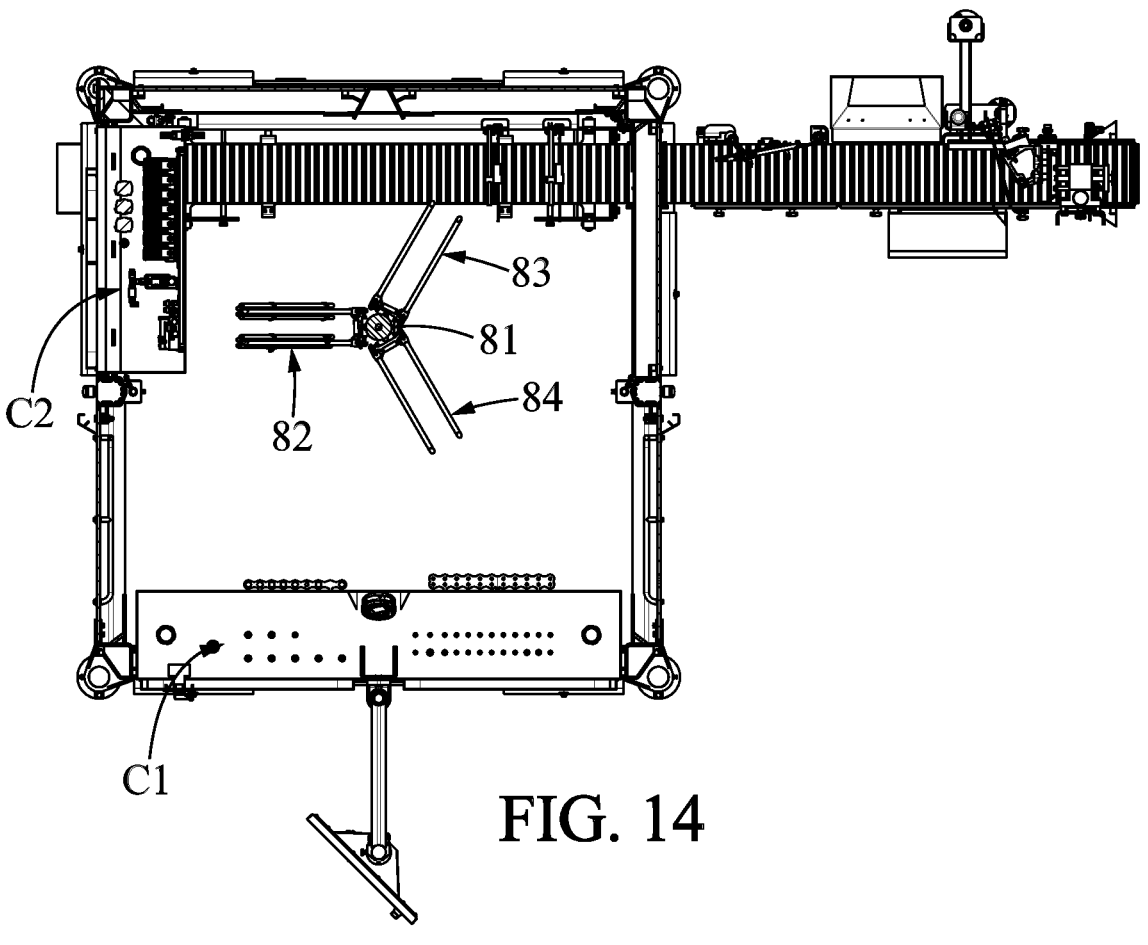

FIG. 14 is a sectional view of the robot cell, according to a horizontal plane, illustrating the position of the arms of the robot with respect to the conveyor.

Figure 5:
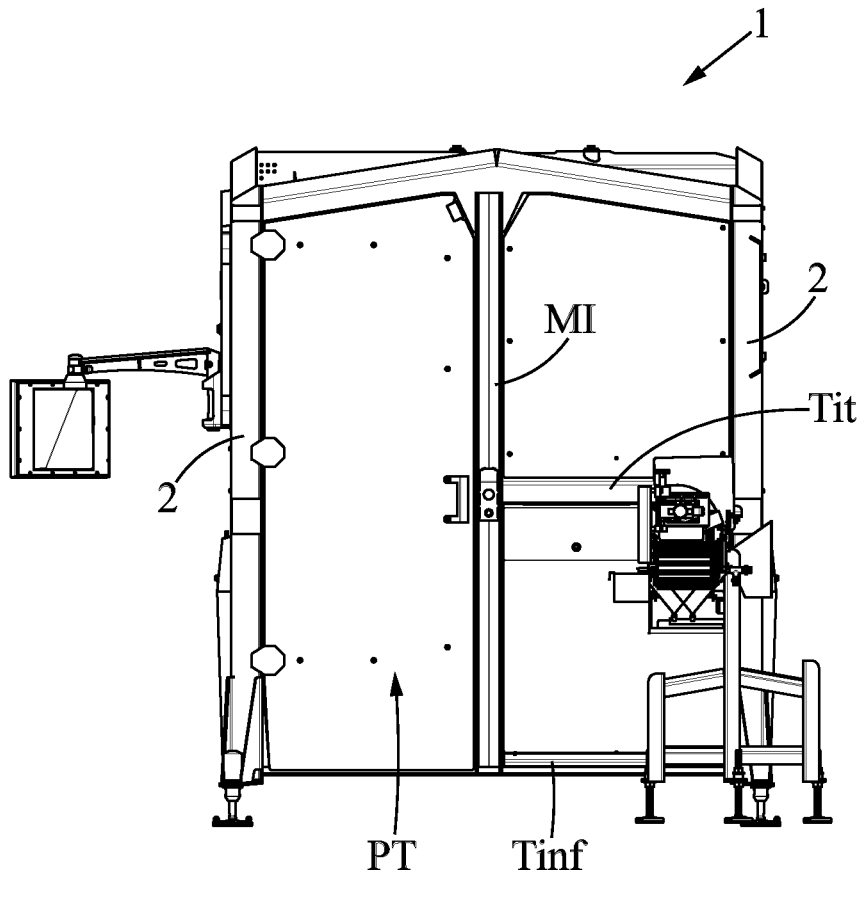
FIG. 5 is a view of the right side of the cell of FIG. 4, illustrating an access opening for the cell closed by a door.

FIG. 5 is a sectional view of the robot cell, according to a horizontal plane, illustrating the open sections of the beams of the corner posts and of the intermediate posts, the beams with an open section of the corner posts are formed by folded sheet metals with a L-shaped section; each having a longitudinal fold line with the concavity of the section oriented outwardly of the cell.

Figure 16:
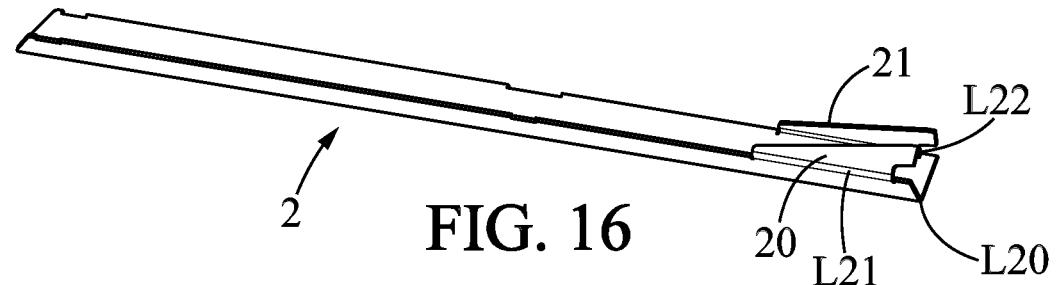

FIG. 16 is a detail view of the corner post, illustrating in particular the sheet metal with a L-shaped section, having proximate to its low end two local extensions extending respectively beyond the longitudinal borders of the L via a second fold and a third fold of the sheet metal, the extensions converging towards one another so that the lower edge of the beam comprises the L-shaped section of the frame profile, as well as two additional supports of the two local extensions, bearing on the underframe.

Figure 17:
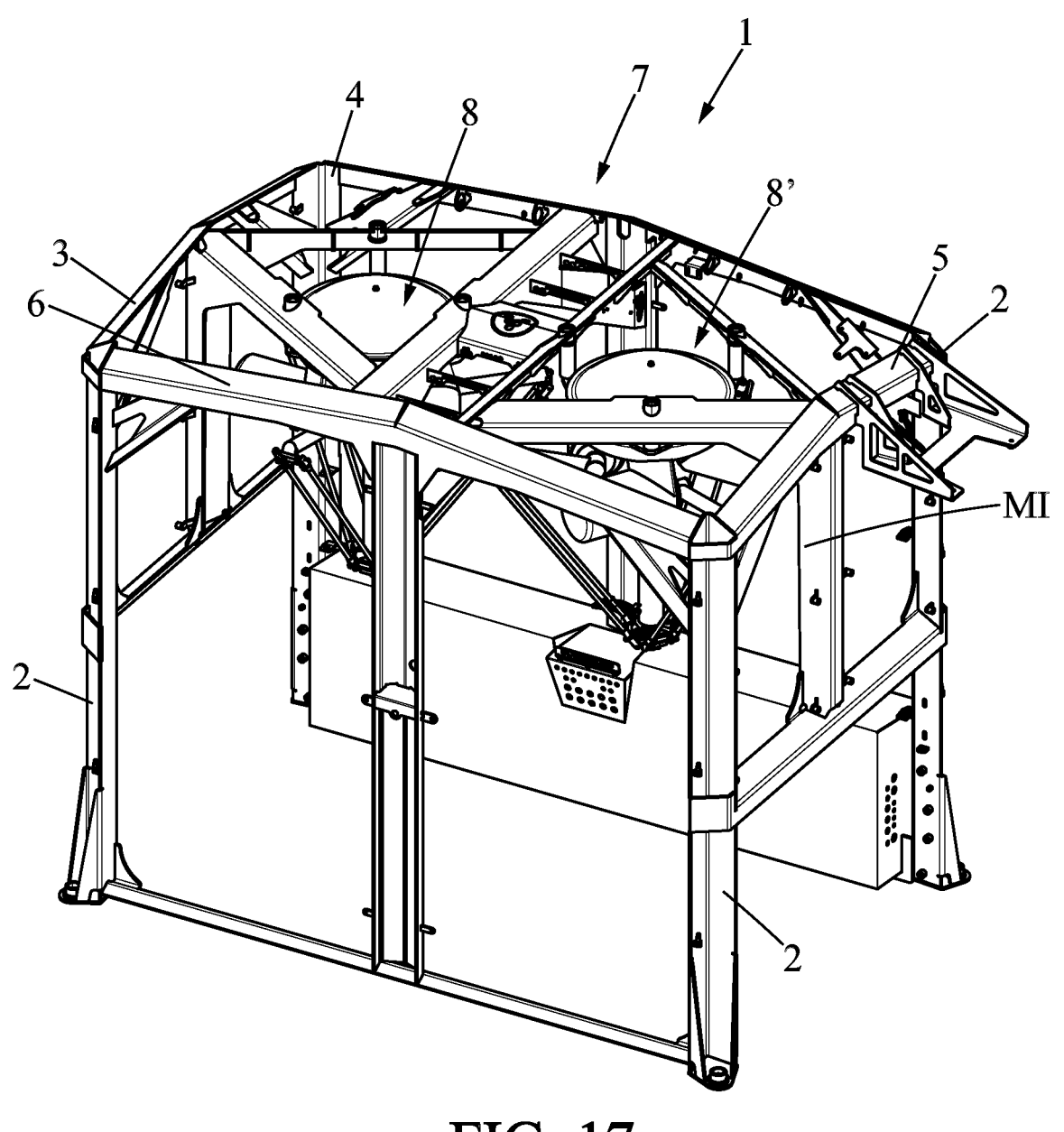

FIG. 17 is a perspective view of a robot cell whose central support, bearing on the four apexes of the upper crossbars of the cell, ensures supporting of a first robot, and a second robot, arranged side-by-side in the robot cell.

Figure 18:
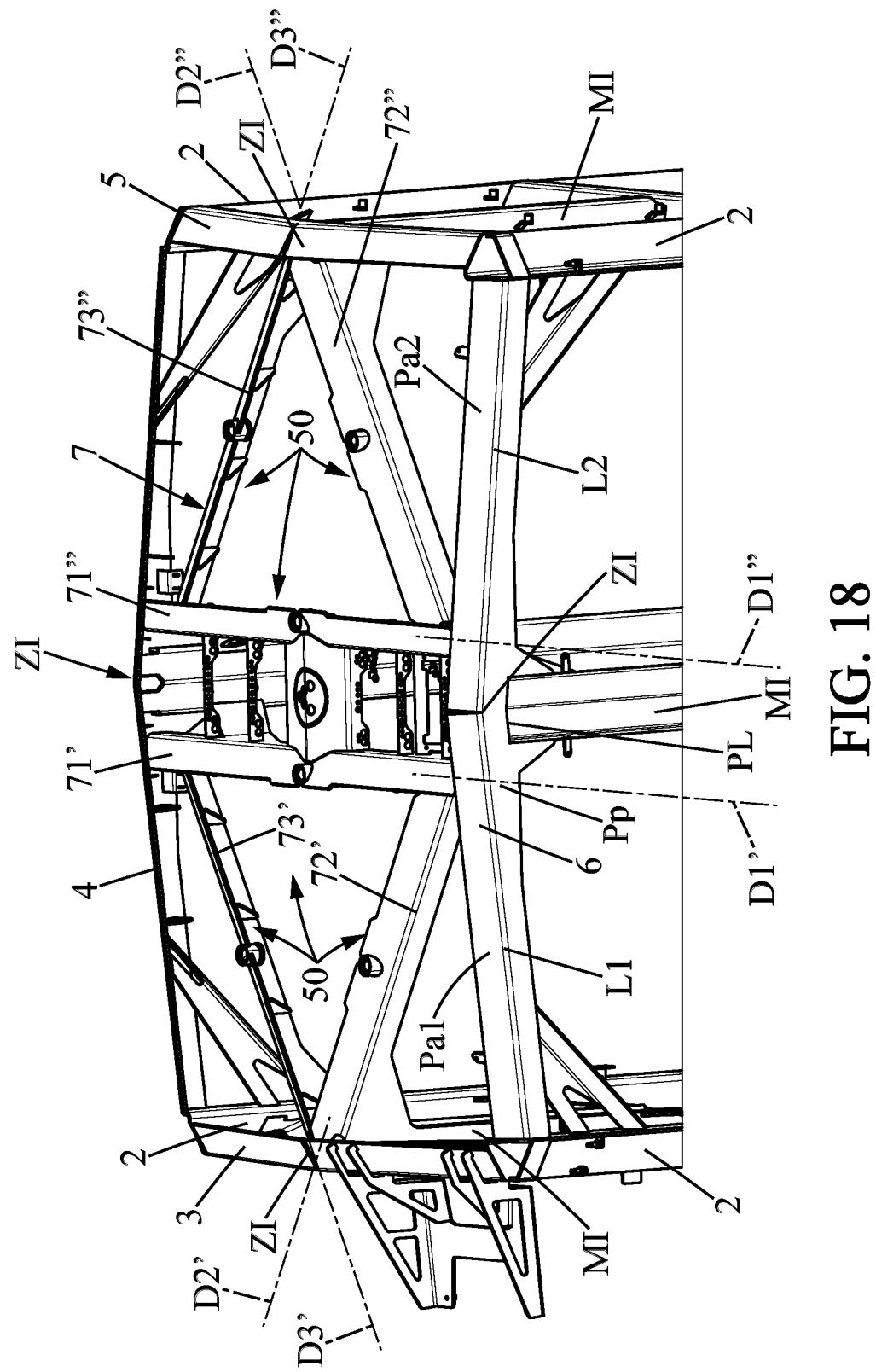

FIG. 18 is a detail view of the structure of the central support configured to support the two robots, side-by-side, offset from one another along a longitudinal axis of the robot cell.

DETAILED DESCRIPTION

The drawings and the description hereinafter essentially contain elements that are certain. Hence, they can not only serve to better understand the present disclosure, but also contribute to the definition thereof, where appropriate.

Figure 1:
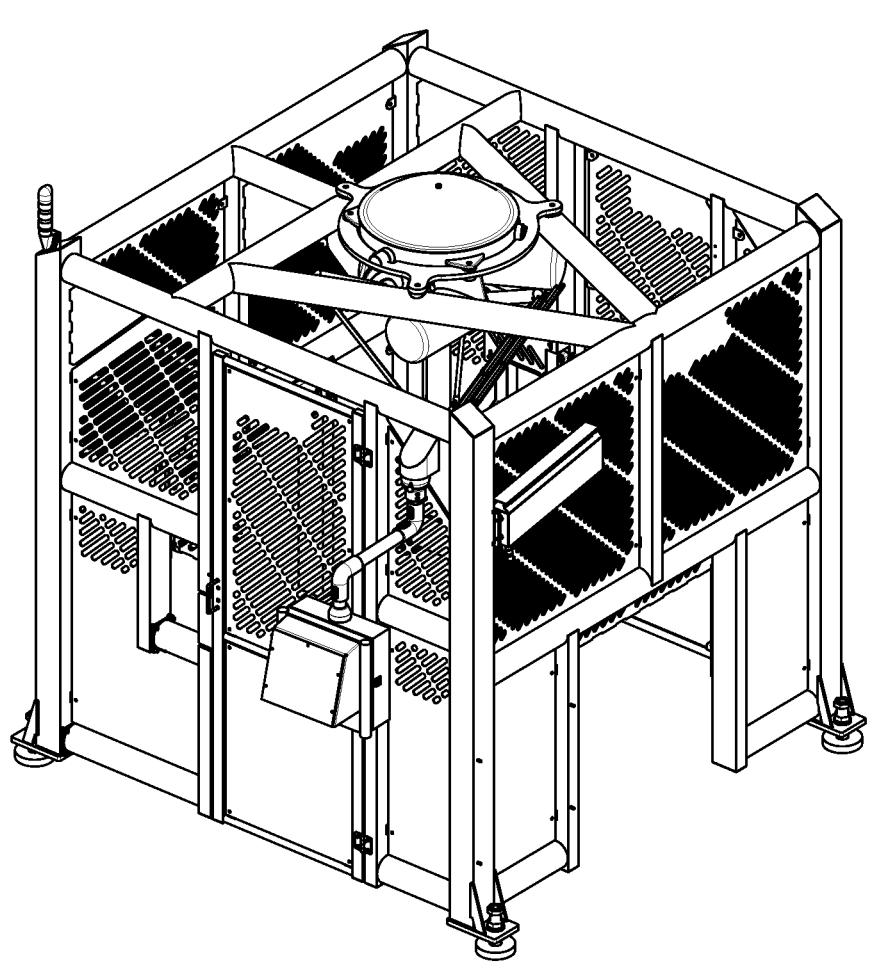
FIG. 1 is a perspective view of a robot cell whose structure results from mechanical welding of beams consisting of frame profiles with a closed section, with frame profiles with a square section for the corner posts and frame profiles with round sections, which does not allow guaranteeing good hygiene in case of high-pressure wet cleaning, water being able to get in and be trapped in the cavity of the frame profiles of the beams, and be at the origin of an environment, inaccessible for cleaning, conducive to the growth of pathogens, the robot cell comprising a central support for a parallel-kinematics robot hanging from the central support configured to work at a high rate within the cell.
Figure 2:
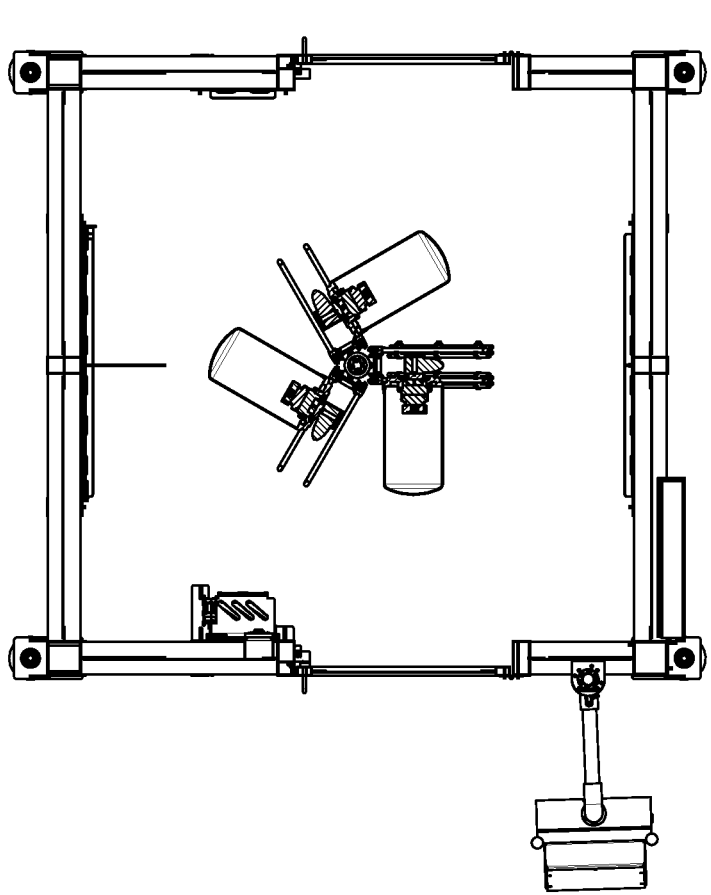
FIG. 2 is a sectional view of FIG. 1 according to a horizontal section plane.
Figure 3:
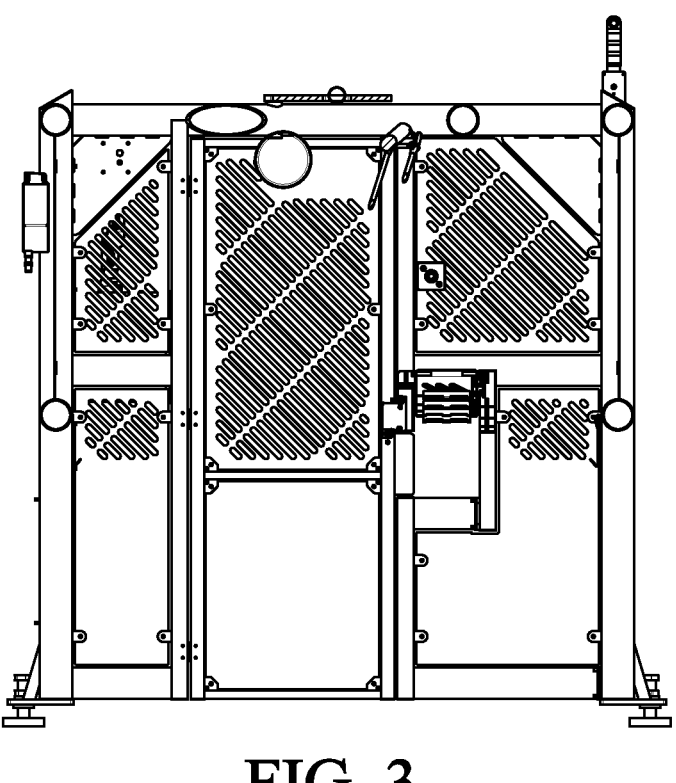
FIG. 3 is a side view of the robot cell, illustrating an access opening closed by a door.

Reference is now made to FIG. 1 which discloses a robot cell whose structure comprises beams with a closed section respectively forming corner posts, upper crossbars, linking the corner posts, lower crossbars, and possibly intermediate and lower crossbars.

A central support is locally fastened at four intermediate areas on the upper crossbars, this central support resulting from a mechanical welding of frame profiles with a closed section, this central support ensuring hanging of a base unit of a parallel-kinematics robot configured to work at high rate, for example typically higher than 100 transfers per minute.

Such a robot cell structure resulting from a mechanical welding of frame profiles with a closed section is fully satisfactory with regards to the high production rates, but does not allow guaranteeing impeccable hygiene, in particu-lar when the structure is wet cleaned by a high-pressure water jet.

FIGS. 4 to 16 illustrate an embodiment of a robot cell 1 according to the present disclosure, guaranteeing a proper cleanability of the robot cell, while preserving high-rate production capabilities of the robot.

The robot cell according to the present disclosure com-prises:

a structure (or "frame") delimiting a cell with a closed section, typically polygonal, in particular rectangular, comprising:

metallic corner posts 2, extending vertically to the edges of the cell, the corner posts being preferably equipped at the lower ends of the posts with under-frames bearing on the ground, metallic upper crossbars 3, 4, 5, 6 linking, in pairs, the upper ends of the posts over a periphery of the section cell, a central support 7 formed by the assembly of metallic elements, extending over the cell between the upper crossbars 3, 4, 5, 6, resting locally at fastening supports on the upper crossbars, at intermediate areas of the upper crossbars.

Typically, the cell has a rectangular section, for example square comprising corner posts 2, four in number, and upper crossbars, four in number, the upper crossbars 3, 4, 5, 6 respectively linking the upper ends of two consecutive ones of the corner posts 2.

The structure may also comprise lower Tinf, or interme-diate Tit, crossbars and intermediate posts MI. The interme-diate posts ensure support of upper crossbars, at an inter-mediate area between the distal ends of the upper crossbar in connection with the corner posts.

Typically, the robot cell comprises partition wall CL delimiting the inner volume of the cell, the partition walls extending respectively between the corner posts 2 of the metallic structure, the partition walls configured to partition the inner volume of the cell and prevent access thereto from the outside, the robot cell has over at least one side an access opening closed by a door PT. A locking system may prevent opening of the door when the robot works, or a door opening detection system may be configured to trigger the emer-gency stoppage of the robot in case of detection of opening of the door.

The robot cell also comprises at least one robot 8, preferably a parallel-kinematics robot, housed within the volume of the cell. Such a robot is not specifically described in detail because it is well-known to a person skilled in the art, for example from the document WO 2019/206403A1.

The figures illustrate a possible embodiment of the cell receiving a unique robot. According to other possible embodiments, the cell may receive several robots 8, and in particular two robots.

Such a robot 8 typically comprises:

a base unit 80 fastened to and hanging from the central support 7, a platform 81 movable relative to the base unit according to a plurality of main axes, at least two movable actuation arms 82, 83, 84, for example three movable arms 82, 83, 84, linking the base unit 80 to the platform 81 configured to move the platform relative to the base unit, a gripper 85 coupled to the platform preferably rotatably about an auxiliary axis.

In the case where the cell comprises several robots, the base units of the robots hang from the central support 7.

Preferably, the robot cell also comprises at least one conveyor 9 for products, the conveyor crossing the cell, positioned below an area of action of said robot. The robot 8 is configured to perform transfers of products comprising depositions over the surface of the conveyor, or for pick-ups on the surface of the conveyor.

According to the present disclosure and in particular, the structure comprises an assembly of metallic beams with an open section SO, the beams with an open section SO being configured to ensure wet cleanability of the structure, at least with regards to the corner posts 2, the upper crossbars 3, 4, 5, 6 and preferably the central support 7, and possibly lower or intermediate crossbars, or with regards to the intermediate posts. Preferably, all of the beams of the structure have an open section SO.

Preferably, the beams with an open section SO of the assembly are assembled by welding so as to form a mechanically-welded structure.

In general, the beams with an open section may be obtained by folding a sheet metal, with one or more longitudinal fold line(s). The fold line(s) is/are intended to stiffen the beam, with a non-planar section of the beam, typically L, V or U shaped. Thus, the beam with an open section SO comprises a concave portion and a convex portion. The open section of the beam guarantees high wet cleanability, by guaranteeing the evacuation of water from the concave portions of the beams. Moreover, the concave portion remains accessible to the operator in particular to proceed with cleaning operations, for example to be cleaned by water flushing, by high-pressure water jet, and possibly accessible for the successive drying operation.

In particular, the structure 2 preferably has no tubular beams with a closed section in particular likely to trap moisture, and inaccessible to the operator. The robot cell according to the present disclosure allows for high cleanability of the structure avoiding the growth of pathogens, in contrast with the prior art with beams with a closed section illustrated in FIG. 1.

While the use of beams with an open section allows for a substantial gain in terms of cleanability, the open section of the beams confers a lesser stiffness on structure, in comparison with beams with a closed section, which affects the accuracy of the operations of the robot, at high rates, because of the inertial forces deforming the structure.

According to the observations of the Inventors, it has been possible to significantly increase the rate of the robot for a cell with a structure composed by beams with an open section, by modifying the upper crossbars, from a rectilinear design of the beams of the upper crossbars as known from the prior art, into an arcuate design as discussed hereinafter. The gain in productivity has been measured at 60% for the same pick-up performance in terms of accuracy in comparison with a design of a structure with beams with an open section, but with a rectilinear (and not arcuate) design for the beams of the upper crossbars.

Thus, and according to another particular feature of the present disclosure, all or part of the upper crossbars 3, 4, 5, 6 are arcuate, so that the intermediate area ZI of the upper crossbars 3; 4; 5; 6 at which the central support 7 is locally fastened, is at a higher height with respect to the distal ends of the crossbar in connection with two successive ones among the corner posts 2 of the cell.

Preferably, all of the upper crossbars 3, 4, 5, 6 are arcuate, the intermediate areas ZI of the upper crossbars 3, 4, 5, 6 on which or proximate to which the central support 7 rests located at higher heights with respect to the distal ends of the upper crossbars in connection with the corner posts 2 of the cell.

In the case of a cell with a rectangular section, in particular square, the structure includes a first upper crossbar 4 and a second upper crossbar 6, opposite to one another and parallel to one another, and a third upper crossbar 3 and a fourth upper crossbar 5, parallel to one another.

FIGS. 10 and 11 give examples of the design of the arcuate upper crossbars, substantially by sheet metal cutting and folding operations.

In general, the beam(s) of all or part of the upper crossbars 3, 4, 5, 6 may comprise two longitudinal fold lines L1, L2, in continuation, with a first longitudinal fold line L1 over a first lengthwise section S1 of the beam in particular over a first half of the length, and a second longitudinal fold line L2 over a second lengthwise section S2 and in particular over a second half of the length of the beam.

The first lengthwise section S1 extends along the first fold line L1, and the second lengthwise section S2 extending along the second fold line L2, the first fold line L1 and the second fold line L2 being inclined with respect to one another to form an arch whose apex S is at the junction between the first lengthwise section S1 and the second lengthwise section S2 of the upper crossbar 3; 4; 5; 6.

The beam forming an upper crossbar 3; 4; 5; 6 may have, on the one hand, on the lower side with respect to the two fold lines L1, L2 in continuation, a main wall Pp integrally in one-piece extending over the first section S1 and over the second lengthwise section S2, and on the other hand, on the upper side with respect to the two fold lines L1, L2 in continuation, two auxiliary walls Pa1, Pa2.

The auxiliary walls are inclined with respect to the main wall Pp, with a first auxiliary wall Pa1 adjacent by the first longitudinal fold line L1 to the main wall Pp, forming a L-shaped section over the first lengthwise section S1, and a second auxiliary wall Pa2 adjacent by the second longitudinal fold line L2 to the main wall Pp, forming a L-shaped section over the second lengthwise section S2. The two auxiliary walls Pa1, Pa2 are inclined with respect to one another, separate by a cutout DC at the apex of the arch.

As shown in FIG. 10 or 11, and in general, the lower border Bi of the main wall Pp comprises at the junction area between the first lengthwise section S1 and the second lengthwise section S2 of the upper crossbar 3; 4; 5; 6, a horizontal flat portion PL against which bears an upper end of a beam with an open section of an intermediate post MI configured to support the apex S of the arch. On either side of the flat portion PL, one could notice that the lower border Bi may be preferably inclined parallel to the direction of the first longitudinal fold L1 over the first lengthwise section S1, and parallel to the second longitudinal fold L2 over the second lengthwise section S2 of the beam.

In general, the cell may have a rectangular section, for example square comprising corner posts 2, four in number, and upper crossbars, four in number, the upper crossbars 3, 4, 5, 6 respectively linking the upper ends of two consecutive ones of the corner posts 2.

The design of the central support 7 is illustrated as example in FIG. 9, and in details in FIGS. 12 and 13. In general, the central support 7 may extend over a horizontal plane.

According to an advantageous embodiment, the structure of the central support 7 may comprise:

a first transverse beam 70 extending along a first direction D1, with an open section SO, linking two among the four upper crossbars, the two upper crossbars, the first upper crossbar 4 and the second upper crossbar 6, parallel to one another and opposite to one another, the distal ends of the beam with an open section of the first transverse beam 70 being secured to the two upper crossbars 4, 6 at the apexes of the arches formed by the first and second upper crossbars 4, 6, a second transverse beam 71, with an open section SO, extending along a second direction D2, perpendicular to the first direction D1, linking a third one amongst the upper crossbars, from the apex of the arch formed by the third crossbar 3 up to the middle of the first transverse beam 70, a third transverse beam 72, with an open section SO, extending according to a third direction D3, and a fourth transverse beam 73, with an open section, extending according to a fourth direction D4, preferably symmetrically to the third transverse beam 3 with respect to the second direction D2.

Both of the third transverse beam 72 and the fourth transverse beam 73 extending from the apex S of the arch of a fourth upper crossbar 5, respectively up to two fastening positions on the first beam 70, the two fastening positions being offset on either side of the middle of the first transverse beam.

In general, and as shown in FIG. 9, the first transverse beam 70, the third transverse beam 72 and the fourth transverse beam 73 form the three sides of a support triangle, in particular isosceles, and possibly equilateral. The base unit is fastened by three anchor points O1, O2, O3 respectively distributed at the middles of the three sides of the triangle. In general and as illustrated in FIG. 9, the three anchor points may consist of orifices in the wall of the beams 70, 72, 73.

In general, the second transverse beam 71 may be obtained by folding a sheet metal forming a structure element integrally in one-piece, the structure element forming not only the second transverse beam 71 extending along the second direction D2 but also an intermediate post MI, extending vertically downwards, the intermediate post MI supporting the apex S of the arch of the third upper crossbar 3 and as it could be understood from FIG. 13.

In general, the third transverse beam 72 and the fourth transverse beam 73 may be obtained by folding a sheet metal forming a structure element integrally in one-piece forming not only the third transverse beam 72 and the fourth transverse beam 73, but also an intermediate post MI, extending vertically as a downward continuation of the third beam 72 and of the fourth beam 73, the intermediate post MI supporting the apex S of the arch of the fourth upper crossbar 5, and as illustrated in FIG. 13.

In general, the support structure 7, illustrated in particular in FIGS. 4 to 16, is suited to support/hang a unique robot 8.

According to another possibility illustrated in FIGS. 17 and 18, the robot cell may be suited to support/hang two robots 8, 8', side-by-side, offset from one another along a longitudinal axis of the cell.

Referring to FIG. 17, the robot cell has a rectangular section, two amongst the four upper crossbars being transverse upper crossbars 3, 5, oriented transversely to a longitudinal axis of the cell and the two other upper crossbars 4, 6 being longitudinal crossbars 6 and 7, oriented longitudinally to said longitudinal axis of the robot cell.

The central support 7 which bears on the intermediate areas ZI at the apexes of the four upper crossbars 3, 4, 5, 6 supports the two robots 8, 8', arranged, side-by-side, along a longitudinal direction of the rectangular section, the two robots including a first robot 8 and a second robot 8'.

Referring to FIG. 18, the structure of the central support 7 supporting the two robots 8, 8' may extend over a horizontal plane, the structure comprising a first structure portion for the support of the first robot 8 and a second structure portion for the support of the second robot 8'.

Referring to FIG. 18, the first structure portion supporting the first robot 8 comprises:

a first transverse beam 71' extending along a first direction D1', with an open section SO linking the two longitudinal crossbars 4, 6, the longitudinal first upper crossbar 4, and the longitudinal second upper crossbar 6, parallel to one another and opposite to one another, the distal ends of the beam with an open section of the first transverse beam 71' secured to the two upper crossbars 4, 6 at the apexes of the arches formed by the first and second upper crossbars 4, 6, a second transverse beam 72', with an open section SO, extending according to a second direction D2', and a third transverse beam 73', with an open section extending according to a third direction D3', preferably symmetrically to the third transverse beam 3 with respect to a longitudinal axis of the cell, the second transverse beam 72', and the third transverse beam 73' both extending from the apex S of the arch of a transverse third upper crossbar 3, respectively up to two fastening positions on the first transverse beam 71', the two fastening positions being offset on either side of the middle of the first transverse beam 714.

The first transverse beam 71', the second transverse beam 72' and the third transverse beam 73' form the three sides of a first support triangle, in particular isosceles, and possibly equilateral:

a base unit of the first robot 8 is fastened by three anchor points O1, O2, O3 respectively distributed at the middles of the three sides of the triangle.

Referring to FIG. 18, the second structure portion supporting the second robot 8' comprises:

a fourth transverse beam 71" extending along a direction D1' parallel to the first direction D1', with an open section SO linking the two longitudinal crossbars 4, 6 forming the first crossbar 4 and the second crossbar 6, the distal ends of the beam with an open section of the fourth transverse beam 71" secured to the two upper crossbars 4, 6 at the apexes of the arches formed by the first and second upper crossbars 4, 6, a fifth transverse beam 72", with an open section SO, extending according to a fourth direction D2", and a sixth transverse beam 73", with an open section extending according to a fifth direction D3", preferably symmetrically to the fifth transverse beam 73" with respect to a longitudinal axis of the cell, the fifth transverse beam 72', and the sixth transverse beam 73" both extending from the apex S of the arch of a transverse fourth upper crossbar 5, respectively up to two fastening positions on the fourth transverse beam 71", the two fastening positions being offset on either side of the middle of the fourth transverse beam 71", the fourth transverse beam 71", the fifth transverse beam 72" and the sixth transverse beam 73" forming the three sides of a second support triangle, in particular isosceles, and possibly equilateral, and wherein a base unit of said second robot 8' is fastened by three anchor points O1, O2, O3 respectively distributed at the middles of the three sides of the second triangle.

According to a possible manufacture of the central support 7 for the two robots:

the second transverse beam 72' and the third transverse beam 73' are obtained by folding a sheet metal forming a structure element integrally in one-piece forming not only the second transverse beam 72' and the third transverse beam 73', but also an intermediate post MI, extending vertically as a downward continuation of the second transverse beam 72' and of the third transverse beam 73', the intermediate post MI supporting the apex S of the arch of the third upper crossbar 3, and/or the fifth transverse beam 72" and the sixth transverse beam 73" are obtained by folding a sheet metal forming a structure element integrally in one-piece forming not only the fifth transverse beam 72" and the sixth transverse beam 73", but also an intermediate post MI, extending vertically as a downward continuation of the fifth transverse beam 72" and of the sixth transverse beam 73", the intermediate post MI supporting the apex S of the arch of the fifth upper crossbar 5.

Figure 6:
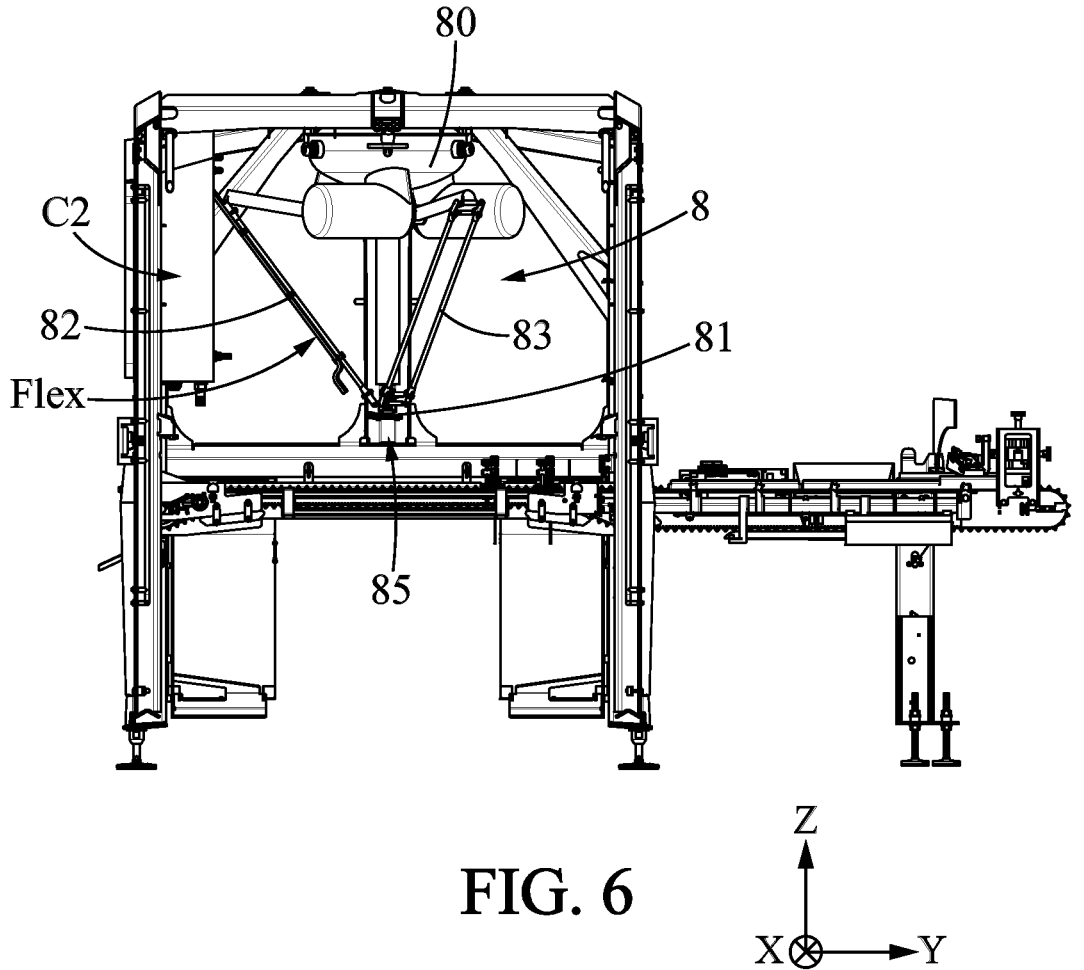
FIG. 6 is a view according to a substantially vertical section plane, illustrating the parallel-kinematics robot which hangs from a central support, at the upper portion of the structure.

In general, the structure of the cell may comprise struts 10, 11, 12 and 13 with an open section SO, each respectively joining, from a distal end of the strut 10; 11; 12; 13, a corner post 2, at an intermediate position on the post, to one of the upper crossbars 3, 4, 5, at an intermediate position of the upper crossbar and as shown as example in FIGS. 6 and 8.

In general, all or part of the lower crossbars Tinf, and/or all or part of the intermediate crossbars, with an open section SO are obtained by folding a sheet metal, comprising one or more longitudinal fold line(s).

According to an advantageous embodiment, the upper flange of the lower or intermediate crossbar may be inclined forming a deflector Df with a slope descending outwardly of the robot cell.

Figure 7:
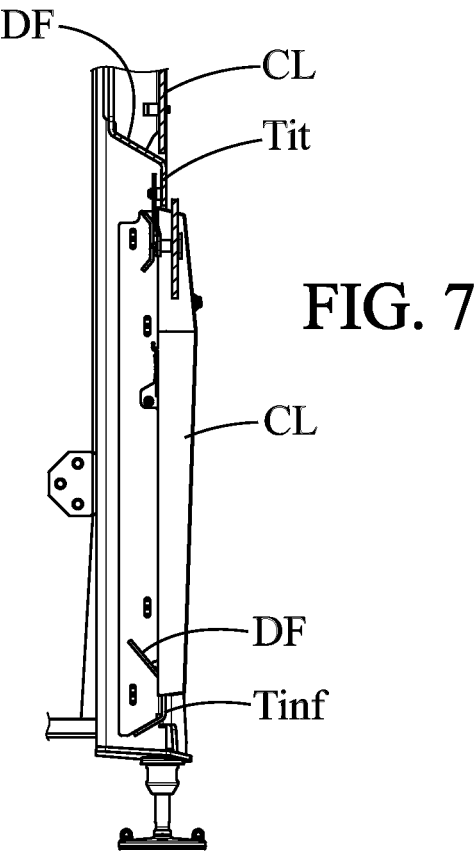
FIG. 7 is a sectional view, of one face of the cell, including a transparent upper partition wall, and a metallic lower partition wall, illustrating in particular.

In general, and as illustrated in the sectional view of FIG. 7, the deflector(s) Df are positioned in line with the partition walls CL, so that cleaning water flowing by gravity upon descending an inner face of a partition wall CL is diverted by the deflector Df to the outside of the robot cell.

In general, the beams with an open section SO of the corner posts 2 may be formed by folded sheet metals with a L-shaped section; each having a longitudinal fold line L20, preferably the concavity oriented outwardly of the cell.

In general, and as illustrated for indication in FIG. 16, the sheet metal with a L-shaped section, may have proximate to its lower end two local extensions 20, 21 extending respectively beyond the longitudinal borders of the L via a second fold L21 and a third fold L22 of the sheet metal. These extensions converge towards one another so that the lower edge of the beam comprises the L-shaped section of the frame profile, as well as two additional supports of the two local extensions 20, 21, bearing on the underframe.

In general, the underframes equipping the lower distal ends may comprise actuation cylinders for setting the height.

According to one embodiment, the robot cell may include an electrical box C1 accommodating an electric power supply unit, and possibly an electrical control unit of said at least one robot 8.

Advantageously, the electrical box C1 is a structural metallic box integral with the structure of the robot cell. In other words, the box contributes to and enhances the stiffness of the structure, in comparison with the same structure without said electrical box.

The electric power supply unit, and possibly electrical control unit, of said at least one robot being integrated to the structure of the robot cell, the need for an auxiliary electrical and control unit, independent of the structure, as typically encountered in robot cells of the prior art, is advantageously eliminated.

The electrical box C1 is welded to the beams with open sections SO of the structure, in particular welded to two posts of the structure, for example to one of the corner posts 2 and one of the intermediate posts MI, or the box is welded to two of the corner posts 2 of the cell and/or in particular welded to two crossbars of the structure.

Figure 15:
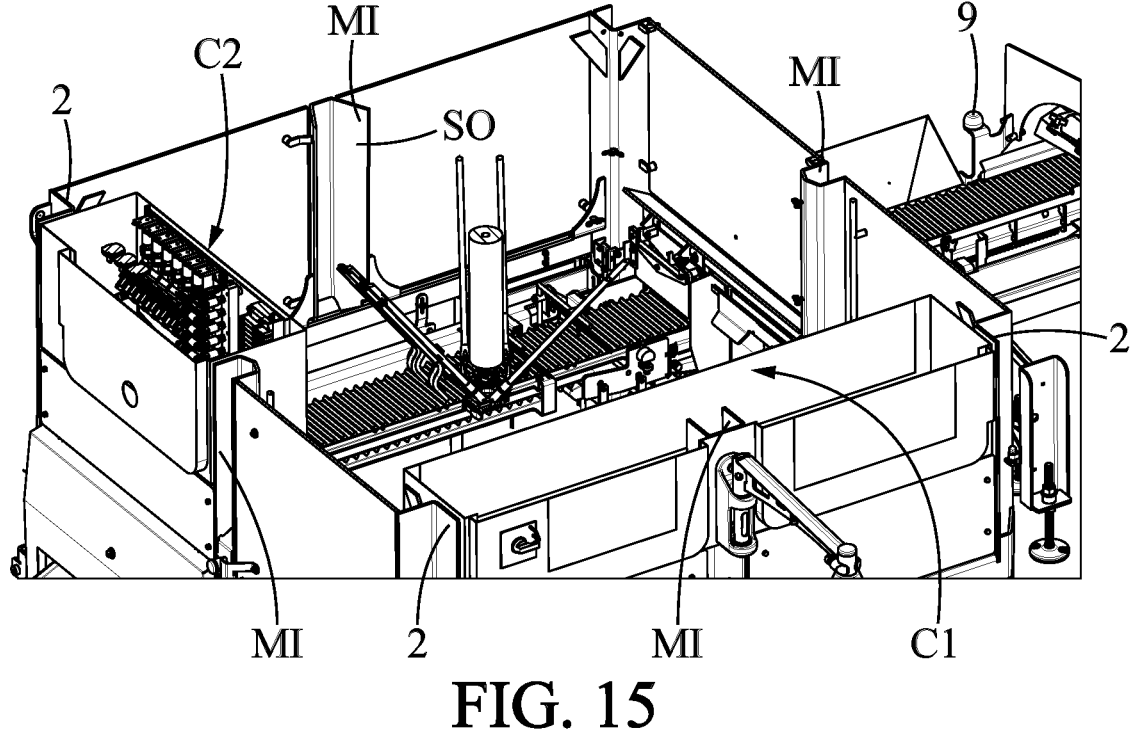

According to one embodiment, illustrated as example in FIG. 15, the structural electrical box C1 comprises a U-shaped structural sheet metal, forming a concavity oriented outwardly of the robot cell. The lateral flanges of the structural sheet metal, extend along two vertical directions of the structure and are respectively welded to two posts of the structure, and for example to one amongst the corner posts 2 and an intermediate post MI, preferably over the entire height of the electrical box C1.

Figure 4:
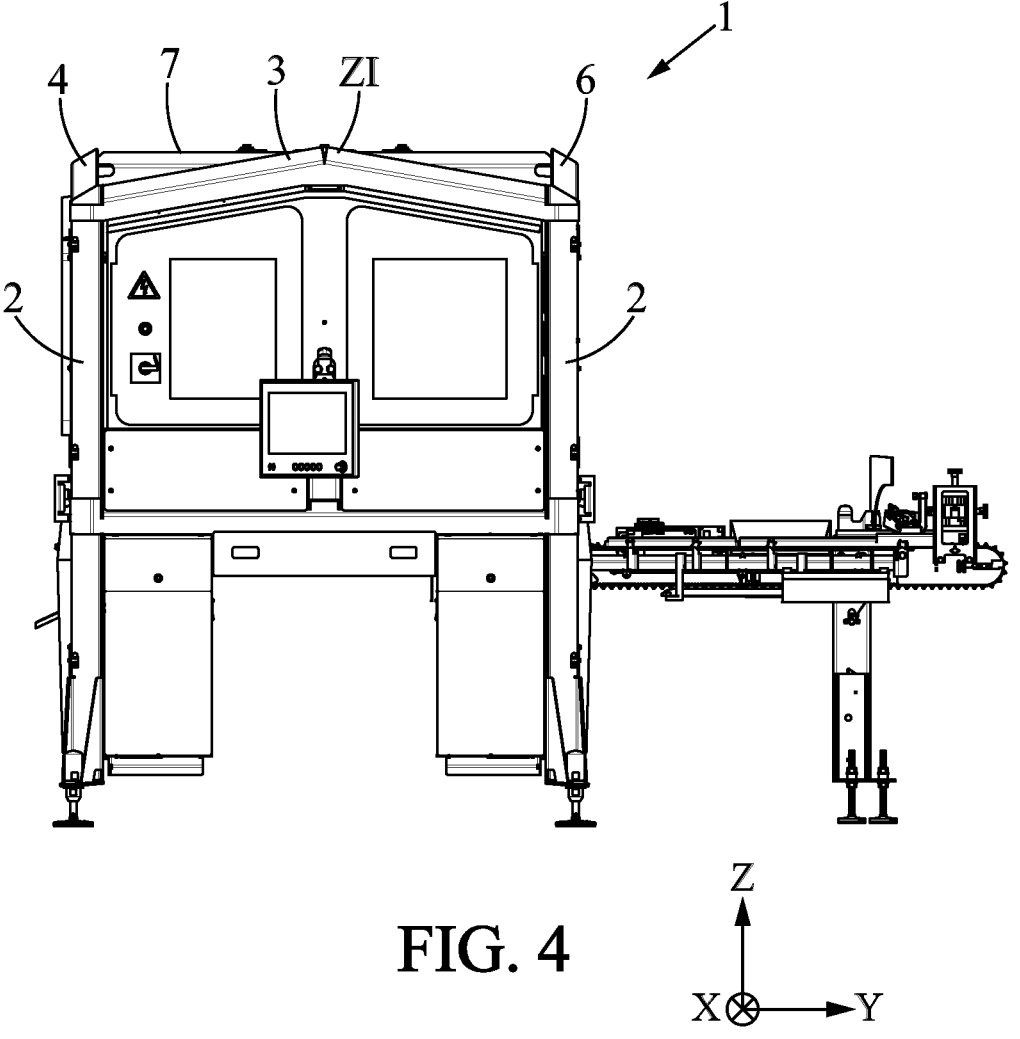
FIG. 4 is a front view of a robot cell according to the present disclosure which is particular in that the structure is a mechanically-welded assembly of beams with an open section including at least corner posts, at the vertical edges of the structures, upper crossbars linking in pairs the corner posts over the periphery, and a central support at the upper portion fastened at several local positions on the upper crossbars, at intermediate areas of these, the open section of the beams always enabling the operator to access the different inner and outer faces of the beams to guarantee cleanability thereof, the view illustrating the side of the cell including a human-machine interface, for example with screens in the partition walls, as well as a screen hanging cantilevered by a bracket, itself in the form of a frame profile with an open section, the view illustrating a projecting portion of the conveyor which extends outside the robot cell.

The power supply unit, and possibly the control unit, of the robot is accommodated in the concavity of the structural sheet metal, which is tightly closed by a partition wall, at least partially removable, in order to be accessible from outside the robot cell. The partition wall may comprise one or more inspection window(s) for one or more visual interface(s) accommodated in the box. An interface, in particular a screen, may be provide outside the cell, hanging cantilevered from the electrical box 2, and as illustrated in FIG. 4.

Alternatively or in addition, the robot cell may advantageously include a cleaning box C2 accommodating a fluid cleaning unit, comprising an inlet for a cleaning fluid external source, as well as one or more outlet(s) connected to one or more hose(s) Flex configured to convey the cleaning fluid at least up to the gripper of the robot, and possibly to the grippers of the robots of the cell.

For example, the cleaning fluid may be water, for example soapy water.

The cleaning box C2 accommodates control valves, and a unit for controlling the valves configured to implement an automated cleaning cycle. The valves are fluidly interposed between the inlet and the outlet(s). An automation of the control unit allows controlling the valves to ensure a cleaning cycle. In FIG. 6, and in general, it is possible to provide for a hose Flex which connects a fluid outlet of the cleaning box C2, and runs along one of the movable arms 82 of the robot. The distal end of this hose Flex allows projecting a cleaning jet up to the gripper 85 of the robot, during the implementation of a cleaning cycle, and so as to clean the gripper 85, and where appropriate one or more suction cup(s) of the gripper 85.

Advantageously, the cleaning box C2 is a structural metallic box integral with the structure of the robot cell. The cleaning box C2 is welded to the beams with open sections SO of the structure, in particular welded to two posts of the frame, for example to a corner post 2 and an intermediate post MI, or welded to two consecutive corner posts 2 of the cell and/or in particular welded to two crossbars of the structure, as illustrated in FIG. 15.

According to one embodiment, illustrated as example in FIG. 15, the structural cleaning box C2 comprises a U-shaped structural sheet metal, when viewed according to a horizontal section plane, forming a concavity oriented outwardly of the robot cell. The lateral flanges of the structural sheet metal, extending along two vertical directions of the structure and are respectively welded to two posts of the structure, and for example to two posts preferably over the entire height of the cleaning box C2.

The structural sheet metal may be U-shaped, also when viewed according to a vertical section plane, forming the concavity oriented outwardly, the lower and upper flanges of the U-shaped sheet metal can be respectively welded to two crossbars of the structure, for example between one amongst the upper crossbars and an intermediate crossbar.

The present disclosure also relates to a method for transferring products comprising providing a robot cell according to the present disclosure and controlling the parallel-kinematics robot to proceed with transfers of the products on the surface of the conveyor 9 from a pick-up area, or to pick up products on the surface of the conveyor and deposit them over a deposition area.

Advantages

The present disclosure allows significantly increasing the accuracy of the depositions and/pick-up at high rate while reducing vibrations/oscillations noticed at the level of the base unit of the robot for a cell with a structure composed by beams with an open section, by modifying the upper cross-bars, from a rectilinear design of the beams of the upper crossbars as known in the prior art, into an arcuate design according to the present disclosure.

The gain in productivity has been measured at 60% for the same pick-up performance in terms of accuracy in comparison with a design of a structure with beams with an open section, but with a rectilinear (and not arcuate) design for the beams of the upper crossbars.

The arcuate design of the upper crossbars allows substantially reducing the vertical oscillations of the gripper 85 when the robot works at high rate and exerts during this work considerable inertial forces on the structure of the cell.

During this work, it is desired to work at the highest possible rate while limiting the vertical oscillations at the level of the gripper to a threshold value, preferably lower than 2 mm. The vertical oscillations are herein exclusively due to the deformation of the structure when the latter is subjected to the inertial forces of the robot working at high rate.

Tests have been carried out for a robot whose maximum work amplitude is 1,300 mm (diameter) and a maximum rate of 150 transfers per minute according to the specifications of the manufacturer of the robot.

According to the method, and without limitation, for example, the transfers can be performed by the robot at a rate higher than 80, and possibly 100 transfers per minute, and for an amplitude of the transfer preferably higher than or equal to 500 millimeters along the transverse direction and a vertical movement, of at least 50 mm for example 100 mm while limiting the vertical oscillations of the gripper to the threshold value of 2 mm. The transferred products may be food products for loading thereof in a packaging, such as, the compartments of a thermoformed packaging.

For comparison, and when the upper crossbars are rectilinear according to a non-protected (and non-arcuate) disclosure, the rate is limited to 60 transfers per minute in order to limit the vertical oscillations lower than or equal to said threshold value. When the rate is increased to 90 transfers per minute and according to conditions similar to the previous paragraph (amplitude of the transfers along the transverse direction amounting to 500 mm and along the height amounting to 100 mm), the oscillations noticed at the level of the base unit, which reverberate at the level of the gripper are in the range of one centimeter, quite above 2 mm. For many applications, these oscillations do not allow obtaining the accuracy needed for the required work, which leads to the necessity of reducing the rate to recover an acceptable pick-up and/or deposition accuracy typically lower than or equal to 2 mm.

When the cell structure comprises the electrical box C1 and/or the cleaning box C2, another advantage is to eliminate the need for unit(s) auxiliary to the cell, for the control and electric power supply of the robot and/or an auxiliary unit for cleaning the robot and in particular its gripper.

LIST OF THE REFERENCE SIGNS

1. Robot cell,
2. Corner posts,

20, 21. Local extensions,
3, 4, 5, 6. Upper crossbars, (3: third crossbar, 4: First crossbar, 6 second crossbar, 5 fourth crossbar),
7. Central support,
70, 71, 72 and 73. First transverse beam, second transverse beam, third transverse beam and fourth transverse beam,
O1, O2, O3. Anchor points,
8. Parallel-kinematics robot,
80. Base unit,
81. Platform,
82, 83, 84. Movable arms,
85. Gripper,
9. Conveyor,
10, 11, 12, 13. Struts,
C1. Electrical box,
C2. Cleaning box,
Flex. Hose (cleaning),
L1; L2. Longitudinal fold lines, respectively first longitudinal fold line and second longitudinal fold line,
S1, S2. Respectively first lengthwise section and second lengthwise section of the upper crossbar,
SO. Open section,
S. Apex (Arch),
Pp. Main wall,
Pa1, Pa2, Auxiliary walls, first and second auxiliary walls,
DC. Cutout (between the auxiliary walls),
Bi. Lower border,
PL. Flat portion,
MI. Intermediate post,
ZI. Intermediate.
FIGS. 17 and 18:
71'. First transverse beam
D1' First direction,
72'. Second transverse beam,
D2'. Second direction
73'. Third transverse beam,
D3'. Third direction,
71". Fourth transverse beam,
72". Fifth transverse beam,
D2" Fourth direction,
'73". Sixth transverse beam,
D3". Fifth direction.

The invention claimed is:
1. A robot cell comprising:
a structure delimiting a cell with a closed section, the structure comprising:
metallic corner posts, extending vertically to edges of the cell,
metallic upper crossbars linking, in pairs, upper ends of the metallic corner posts over a periphery of the cell,
a central support formed by an assembly of at least the metallic corner posts and the metallic upper crossbars, the central support extending over the cell between the metallic upper crossbars and resting locally at fastening supports on the metallic upper crossbars, at intermediate areas of the metallic upper crossbars,
a robot, housed within a volume of the cell, the robot comprising:
a base unit fastened to and hanging from the central support,
a platform movable relative to the base unit according to a plurality of main axes,
at least two movable actuation arms linking the base unit to the platform configured to move the platform relative to the base unit, and a gripper coupled to the platform, and wherein at least one conveyor for products, crosses the cell, positioned below an action area of the robot, and the robot is configured to perform transfers of products comprising depositions over a surface of the at least one conveyor, or for pick-ups on the surface of the at least one conveyor;

an assembly of metallic beams with an open section (SO), the metallic beams with an open section (SO) of the assembly assembled by welding so as to form a mechanically-welded structure, the open section including a concave portion and a convex portion, the metallic beams with the open section (SO) being configured to ensure wet cleanability of the structure guaranteeing evacuation of water from the concave portions of the assembly of metallic beams, the concave portions remaining accessible for cleaning operations, at least with regards to the metallic corner posts and the metallic upper crossbars are arcuate so that the intermediate areas of the metallic upper crossbars at which the central support is locally fastened, is at a higher height with respect to the distal ends of the metallic upper crossbars in connection with two consecutive corner posts of the cell, and wherein the cell has a rectangular section comprising the metallic corner posts, four in number, and metallic upper crossbars, four in number, the metallic upper crossbars respectively linking the upper ends of the two consecutive corner posts, and all of the four upper crossbars are arcuate, the intermediate areas (ZI) of the four upper crossbars over which or proximate to which the central support rests, located at higher heights with respect to the distal ends of the four upper crossbars in connection with the metallic corner posts of the cell.

2. The robot cell according to claim 1, wherein the structure has no tubular beam with a closed section configured to trap moisture.

3. The robot cell according to claim 1, having struts with an open section (SO), each strut respectively joining, from a distal end of each respective strut, a metallic corner post, at an intermediate position on the metallic corner post, to one of the metallic upper crossbars, at an intermediate position of the upper crossbar.

4. The robot cell according to claim 1, wherein a structure of the central support extends over a horizontal plane, the structure comprising:

a first transverse beam extending along a first direction (D1), with a first section (SO) linking two among the four upper crossbars, the two upper crossbars, the first upper crossbar and the second upper crossbar, parallel to one another and opposite to one another, the distal ends of the beam with the first section of the first transverse beam secured to the two upper crossbars at apexes of arches formed by the first upper crossbar and the second upper crossbar, a second transverse beam, with a second open section (SO), extending along a second direction (D2), perpendicular to the first direction (D1), linking a third upper crossbar amongst the metallic upper crossbars, from an apex of the arch of the third crossbar up to a middle of the first transverse beam, a third transverse beam, with a third open section (SO), extending according to a third direction (D3), and a fourth transverse beam, with an open section extending according to a fourth direction (D4), the third transverse beam, and the fourth transverse beam both extending from an apex of the arch of a fourth upper crossbar, respectively up to two fastening positions on the first beam, the two fastening positions being offset on either side of the middle of the first transverse beam, the first transverse beam, the third transverse beam, and the fourth transverse beam forming three sides of a support triangle, and the base unit is fastened by three anchor points (O1, O2, O3) respectively distributed at a respective middle of each of the three sides of the support triangle.

5. The robot cell according to claim 4, wherein at least one is true of:

the second transverse beam is obtained by folding a sheet metal forming a structure element integrally in one-piece, the structure element forming not only the second transverse beam extending along the second direction (D2), but also a first intermediate post (MI), extending vertically downwards, the first intermediate post (MI) supporting the apex(S) of the arch of the third upper crossbar, and, the third transverse beam and the fourth transverse beam are obtained by folding a sheet metal forming a structure element integrally in one-piece forming not only the third transverse beam and the fourth transverse beam, but also a second intermediate post (MI), extending vertically as a downward continuation of the third beam and of the fourth beam, the second intermediate post (MI) supporting the apex(S) of the arch of the fourth upper crossbar.

6. The robot cell according to claim 1, further comprising:

partition walls (CL) delimiting an inner volume of the robot cell, wherein the partition walls extend respectively between the metallic corner posts of the structure, the partition walls configured to partition the inner volume of the cell and prevent access thereto from the outside, the robot cell has on at least one side an access opening closed by a door (PT), the structure comprises at least one of: one or more lower crossbar(s) (TInf) and several of the intermediate crossbars (Tit), and the structure includes open sections, extending horizontally between the two consecutive corner posts of the structure, linking by its ends the two corners posts, or linking a corner post in the metallic corner posts to an intermediate post (MI).

7. The robot cell according to claim 6, wherein at least one of all or part of the lower crossbars (Tinf) and all or part of the intermediate crossbars are obtained by folding a sheet metal, comprising one or more longitudinal fold line(s), and at least one upper flange of the lower or intermediate crossbar is inclined forming at least one deflector (Df) with a slope descending outwardly of the robot cell, the at least one deflector (Df) positioned in line with the partition walls (CL), so that cleaning water flowing by gravity upon descending an inner face of a partition wall (CL) is diverted by the at least one deflector (Df) to the outside of the robot cell.

8. The robot cell according to claim 1, wherein the metallic beams with the open section (SO) of the metallic corner posts are formed by folded sheet metals with a L-shaped section, wherein each L-shaped section has a longitudinal fold line (L20).

9. The robot cell according to claim 8, wherein the metallic corner posts are equipped, at a lower end of each metallic corner post, with an underframe configured to bear on the ground, the sheet metal with a L-shaped section, has, proximate to its lower end, two local extensions extending respectively beyond the longitudinal borders of the L-shaped section via a second fold (L21) and a third fold (L22) of the sheet metal, the two local extensions converging towards one another so that the lower edge of the beam comprises the L-shaped section of the frame profile, as well as two additional supports of the two local extensions bearing on the underframe.

10. The robot cell according to claim 1, wherein the metallic beams of all or part of the metallic upper crossbars further comprise two longitudinal fold lines (L1, L2), in continuation, with a first longitudinal fold line (L1) over a first lengthwise section (S1) of the metallic beams, and a second longitudinal fold line (L2) over a second lengthwise section (S2), the first lengthwise section (S1) extending along the first longitudinal fold line (L1), and the second lengthwise section (S2) extending along the second longitudinal fold line (L2), the first longitudinal fold line (L1) and the second longitudinal fold line (L2) being inclined with respect to one another to form an arch whose apex(S) is at a junction area between the first lengthwise section (S1) and the second lengthwise section (S2) of the metallic upper crossbar.

11. The robot cell according to claim 10, wherein the beam forming the metallic upper crossbar has:
    on a lower side of said beam with respect to the two longitudinal fold lines (L1, L2) in continuation, a main wall (Pp) integrally in one-piece, and
    on an upper side of said beam with respect to the two longitudinal fold lines (L1, L2) in continuation, two auxiliary walls (Pa1, Pa2) inclined with respect to the main wall (Pp), with a first auxiliary wall (Pa1) adjacent by the first longitudinal fold line (L1) to the main wall (Pp), forming a L-shaped section over the first lengthwise section (S1), and a second auxiliary wall (Pa2) adjacent by the second longitudinal fold line (L2) to the main wall (Pp), forming a L-shaped section over the second lengthwise section (S2), the two auxiliary walls (Pa1, Pa2) being inclined with respect to one another, separated by a cutout (DC) at the apex of the arch.

12. The robot cell according to claim 11, wherein a lower border (Bi) of the main wall (Pp) comprises, at the junction area between the first lengthwise section (S1) and the second lengthwise section (S2) of the metallic upper crossbar, a horizontal flat portion (PL) against which bears an upper end of a beam with an open section of an intermediate post (MI) configured to support the apex(S) of the arch.

13. The robot cell according to claim 1, wherein, in the rectangular section, a first two among the four upper crossbars are transversal upper crossbars, oriented transversely to a longitudinal axis of the cell and a second two among the four upper crossbars are longitudinal upper crossbars, oriented longitudinally to a longitudinal axis of the robot cell, and the central support which bears on the intermediate areas (ZI) of the four upper crossbars supports two robots arranged, side-by-side, along a longitudinal direction of the rectangular section including a first robot and a second robot.

14. The robot cell according to claim 13, wherein a structure of the central support supporting the two robots extends over a horizontal plane, the structure comprising a first structure portion and a second structure portion, contiguous to each other,
    the first structure portion for the support of the first robot comprises:

a first transverse beam extending along a first direction (D1'), with a first open open-section (SO) linking the two longitudinal crossbars, the longitudinal first upper crossbar, and the longitudinal second upper crossbar, parallel to one another and opposite to one another, the distal ends of the beam with the first open section of the first transverse beam secured to the two upper crossbars at apexes of arches formed by the longitudinal first upper crossbar and the longitudinal second upper crossbar,
    a second transverse beam, with a second open section (SO), extending according to a second direction (D2'), and
    a third transverse beam, with a third open section extending according to a third direction (D3'), the second transverse beam, and the third transverse beam both extending from an apex of the arch of a transverse third upper crossbar, respectively up to two fastening positions on the first transverse beam, the two fastening positions being offset on either side of the middle of the first transverse beam,
    the first transverse beam, the second transverse beam, and the third transverse beam forming three sides of a first support triangle,
    and a base unit of the first robot is fastened by three anchor points (O1, O2, O3) respectively distributed at a respective middle of each of the three sides of the first support triangle, and the second structure portion for the support of the second robot comprises:
    a fourth transverse beam extending along a direction (D1") parallel to the first direction (D1'), with a fourth section (SO) linking the two longitudinal crossbars forming the first crossbar and the second crossbar, the distal ends of the beam with the fourth open section of the fourth transverse beam secured to the two upper crossbars at the apexes of the arches formed by the first upper crossbar and the second upper crossbar,
    a fifth transverse beam, with a fifth open section (SO), extending according to a fourth direction (D2"), and a sixth transverse beam, with the fifth open section extending according to a fifth direction (D3"), the fifth transverse beam, and the sixth transverse beam both extending from an apex of the arch of a transverse fourth upper crossbar, respectively up to two fastening positions on the fourth transverse beam, the two fastening positions being offset on either side of the middle of the fourth transverse beam,
    the fourth transverse beam, the fifth transverse beam and the sixth transverse beam forming three sides of a second support triangle,
    and a base unit of said second robot is fastened by three anchor points (O1, O2, O3) respectively distributed at a respective middle of each of the three sides of the second support triangle.

15. The cell according to claim 14, for the two robots wherein at least one is true of:
    the second transverse beam and the third transverse beam are obtained by folding a sheet metal forming a structure element integrally in one-piece forming not only the second transverse beam and the third transverse beam, but also a first intermediate post (MI), extending vertically as a downward continuation of the second transverse beam and of the third transverse beam, the first intermediate post (MI) supporting the apex(S) of the arch of the third upper crossbar, and the fifth transverse beam and the sixth transverse beam are obtained by folding a sheet metal forming a structure element integrally in one-piece forming not only the fifth transverse beam and the sixth transverse beam, but also a second intermediate post (MI), extending vertically as a downward continuation of the fifth transverse beam and of the sixth transverse beam, the second intermediate post (MI) supporting an apex of the arch of the fifth upper crossbar.

16. The robot cell according to claim 1, further comprising:

an electrical box (C1) comprising an electric power supply unit, wherein the electrical box (C1) is a structural metallic box integral with the structure of the robot cell, the electrical box (C1) being welded to the metallic beams with open sections (SO) of the frame.

17. The robot cell according to claim 1, further comprising:

a cleaning box (C2) accommodating a fluid cleaning unit, wherein the fluid cleaning unit comprises:

an inlet for a cleaning fluid external source, one or more outlet(s) connected to hoses, the cleaning box accommodating control valves, and a unit configured to control the control valves configured to implement an automated cleaning cycle, the cleaning box (C2) is a structural metallic box integral with the structure of the robot cell, and the cleaning box (C2) being welded to the metallic beams with open sections (SO) of the structure.

18. The robot cell according to claim 17, further comprising:

a hose which connects a fluid outlet of the cleaning box (C2), and runs along one of the movable arms of the robot, wherein a distal end of the hose is configured to project a cleaning jet up to the gripper of the robot, during the implementation of a cleaning cycle to clean at least the gripper.

19. A method for transferring products, the method comprising:

providing a robot cell, wherein the robot cell comprises:

a structure delimiting a cell with a closed section, the structure comprising:

metallic corner posts, extending vertically to edges of the cell, metallic upper crossbars linking, in pairs, upper ends of the metallic corner posts over a periphery of the cell, a central support formed by an assembly of at least the metallic corner posts and the metallic upper crossbars, the central support extending over the cell between the metallic upper crossbars and resting locally at fastening supports on the metallic upper crossbars, at intermediate areas of the metallic upper crossbars, a robot, housed within a volume of the cell, the robot comprising:

a base unit fastened to and hanging from the central support, a platform movable relative to the base unit according to a plurality of main axes, at least two movable actuation arms linking the base unit to the platform configured to move the platform relative to the base unit, and a gripper coupled to the platform, at least one conveyor for products, crosses the cell, positioned below an action area of the robot, the robot is configured to perform transfers of products comprising depositions over a surface of the at least one conveyor, or for pick-ups on the surface of the at least one conveyor, the structure comprises an assembly of metallic beams with an open section (SO), the metallic beams with the open section (SO) of the assembly assembled by welding so as to form a mechanically-welded structure, the open section including a concave portion and a convex portion, the metallic beams with the open section (SO) being configured to ensure wet cleanability of the structure guaranteeing evacuation of water from the concave portions of the assembly of metallic beams, the concave portions remaining accessible for cleaning operations, at least with regards to the metallic corner posts and the metallic upper crossbars are arcuate so that the intermediate area (ZI) of the metallic upper crossbars at which the central support is locally fastened, is at a higher height with respect to the distal ends of the metallic upper crossbars in connection with two successive corner posts of the cell, the cell has a rectangular section comprising corner posts, four in number, and metallic upper crossbars, four in number, the metallic upper crossbars respectively linking the upper ends of two consecutive metallic corner posts, all of the four upper crossbars are arcuate, the intermediate areas (ZI) of the four upper crossbars over which or proximate to which the central support rests, located at higher heights with respect to the distal ends of the four upper crossbars in connection with the metallic corner posts of the cell, controlling the parallel-kinematics robot to proceed with transfers, comprising one of:

depositing products over the surface of the at least one conveyor from a pick-up area, or picking up products on the surface of the at least one conveyor and deposit them over a deposition area and according to a rate higher than 70 transfers per minute, and for an amplitude of the transfer, higher than or equal to 400 millimeters transversally, and higher than or equal to 50 mm vertically, while limiting the vertical oscillations of the gripper due to the deformation of the structure, lower than or equal to a threshold value.

\* \* \* \* \*